US009889902B2

(12) United States Patent
Asano

(10) Patent No.: US 9,889,902 B2
(45) Date of Patent: Feb. 13, 2018

(54) VEHICLE

(71) Applicant: YAMAHA HATSUDOKI KABUSHIKI KAISHA, Iwata-shi, Shizuoka (JP)

(72) Inventor: Daisuke Asano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,363

(22) PCT Filed: Jun. 30, 2014

(86) PCT No.: PCT/JP2014/067476
§ 371 (c)(1),
(2) Date: Dec. 28, 2015

(87) PCT Pub. No.: WO2015/002163
PCT Pub. Date: Jan. 8, 2015

(65) Prior Publication Data
US 2016/0144923 A1 May 26, 2016

(30) Foreign Application Priority Data
Jul. 1, 2013 (JP) .................................. 2013-138477

(51) Int. Cl.
*B62K 5/10* (2013.01)
*B62K 5/05* (2013.01)
*B60T 17/22* (2006.01)
*F16D 65/00* (2006.01)
*B62K 5/027* (2013.01)
*B62K 5/08* (2006.01)
(Continued)

(52) U.S. Cl.
CPC ................ *B62K 5/10* (2013.01); *B60T 17/22* (2013.01); *B62J 15/00* (2013.01); *B62J 23/00* (2013.01);
(Continued)

(58) Field of Classification Search
CPC .. B62K 25/08; B62K 5/027; B62K 2005/001; B62K 5/10; B62J 2099/002; B60G 2204/112
See application file for complete search history.

(56) References Cited

U.S. PATENT DOCUMENTS 5,501,511 A 3/1996 Wagner
7,661,771 B2 * 2/2010 Nimura ................. B60T 8/1706
180/219
(Continued)

FOREIGN PATENT DOCUMENTS

CN 2560556 Y 7/2003
CN 100503344 C 6/2009
(Continued)

OTHER PUBLICATIONS

Official Communication issued in International Application PCT/JP2014/067476, dated Sep. 22, 2014.

*Primary Examiner* — James A English
(74) *Attorney, Agent, or Firm* — Keating and Bennett, LLP

(57) ABSTRACT

A vehicle includes a suspension device including a right cover member that is provided at least partially between a left surface of a right brake disc and a ground contact point of a left tire and in a position located closer to the right brake disc than the ground contact point of the left tire when a body frame is in the upright state and when the body frame leans to the left, and a left cover member that is located between a right surface of a left brake disc and a ground contact point of a right tire and in a position located closer to the left brake disc than a ground contact point of the right tire when the body frame is in the upright state and when the body frame leans to the right.

20 Claims, 11 Drawing Sheets

(51) Int. Cl.
  *B62J 23/00* (2006.01)
  *B62J 15/00* (2006.01)
  *B62K 21/02* (2006.01)
  *B62K 25/08* (2006.01)
  *B62L 1/00* (2006.01)
  *B62K 5/00* (2013.01)
  *B62J 99/00* (2009.01)

(52) U.S. Cl.
  CPC ............... *B62K 5/027* (2013.01); *B62K 5/05* (2013.01); *B62K 5/08* (2013.01); *B62K 21/02* (2013.01); *B62K 25/08* (2013.01); *B62L 1/00* (2013.01); *F16D 65/0062* (2013.01); *B62J 2099/002* (2013.01); *B62K 2005/001* (2013.01)

(56) References Cited

U.S. PATENT DOCUMENTS

| | | |
|---|---|---|
| 2005/0167174 A1 | 8/2005 | Marcacci |
| 2008/0053762 A1* | 3/2008 | Nakamura .............. F16D 55/00 188/218 A |
| 2008/0110706 A1* | 5/2008 | Ishida .................... B60T 8/171 188/181 R |
| 2009/0183957 A1* | 7/2009 | Ishida .................... B60T 8/329 188/181 R |
| 2010/0187052 A1* | 7/2010 | Matsubayashi .......... B62J 15/00 188/218 A |
| 2013/0026731 A1* | 1/2013 | Mikura ............... B60B 27/0068 280/279 |
| 2013/0168944 A1 | 7/2013 | Bartolozzi et al. |
| 2015/0298736 A1 | 10/2015 | Sasaki et al. |

FOREIGN PATENT DOCUMENTS

| | | |
|---|---|---|
| CN | 103153769 A | 6/2013 |
| EP | 1 561 612 A1 | 8/2005 |
| EP | 2 557 004 A2 | 2/2013 |
| JP | 64-12144 A | 1/1989 |
| JP | 7-503922 A | 4/1995 |
| WO | 2012/007819 A1 | 1/2012 |
| WO | 2014/098137 A1 | 6/2014 |

* cited by examiner

VEHICLE

BACKGROUND OF THE INVENTION

1. Field of the Invention

The present invention relates to a vehicle including a body frame that leans and two wheels that are aligned in a left-and-right direction.

2. Description of the Related Art

International Patent Publication No. 2012/007819 describes a vehicle including a body frame that leans and two wheels that are aligned in a left-and-right direction.

In general, the vehicle including the body frame that leans and the two wheels that are aligned in the left-and-right direction is a vehicle that turns with the body frame leaning from a vertical direction. More specifically, the body frame leans to the right of the vehicle when the vehicle turns right, whereas when the vehicle turns left, the body frame leans to the left of the vehicle. In the vehicle including the body frame that leans and the two wheels that are aligned in the left-and-right direction, a distance defined between the two wheels that are aligned in the left-and-right direction of the body frame is narrower than that of a general four-wheeled vehicle so as to ensure that the body frame leans as required. The vehicle including the two wheels that are aligned in the left-and-right direction and the body frame that leans is a vehicle that is compact in size in the left-and-right direction.

In the vehicle including the body frame that leans and the two wheels that are aligned in the left-and-right direction described in International Patent Publication No. 2012/007819, a disc brake device is provided on each of the two wheels.

A right brake device includes a right brake disc that is supported on a right wheel and a right brake caliper that is supported on a suspension device. The right brake caliper includes a right-right brake pad that is brought into contact with a right surface of the right brake disc and a right-left brake pad that is brought into contact with a left surface of the right brake disc.

A left brake device includes a left brake disc that is supported on a left wheel and a left brake caliper that is supported on a suspension device. The left brake caliper includes a left-right brake pad that is brought into contact with a right surface of the left brake disc and a left-left brake pad that is brought into contact with a left surface of the left brake disc.

SUMMARY OF THE INVENTION

The inventor of the preferred embodiments of the present invention has discovered from the results of tests carried out on a vehicle like the one described above that includes the body frame that leans and the two wheels aligned in the left-and-right direction that there occurs a situation where the brake discs and the brake pads wear in an unbalanced fashion.

Preferred embodiments of the present invention provide a vehicle that significantly reduces or prevents an unbalanced wear of a brake disc and a brake pad and that includes a body frame that leans and two wheels that are aligned in a left-and-right direction.

A preferred embodiment of the present the invention is a vehicle including a body frame that leans to the right of the vehicle when the vehicle turns right and lean to the left of the vehicle when the vehicle turns left; a right wheel and a left wheel that are spaced apart in a left-and-right direction of the body frame; a suspension device that supports the right wheel and the left wheel on the body frame; a right brake device that includes a right brake disc that is provided on the right wheel and a right brake caliper that brakes the rotation of the right brake disc; and a left brake device that includes a left brake disc that is provided on the left wheel and a left brake caliper that brakes the rotation of the left brake disc; wherein the right wheel includes a right tire and a right wheel member that supports the right tire and rotates together with the right brake disc, the left wheel includes a left tire and a left wheel member that supports the left tire and rotates together with the left brake disc, the right brake caliper includes a right-right brake pad that is positioned to the right of the right brake disc and a right-left brake pad that is positioned to the left of the right brake disc, the left brake caliper includes a left-right brake pad that is positioned to the right of the left brake disc and a left-left brake pad that is positioned to the left of the left brake disc, and the suspension device includes a right cover member that is provided at least partially between a left surface of the right brake disc and a ground contact point of the left tire and in a position located closer to the right brake disc than the ground contact point of the left tire when the body frame is in an upright state and when the body frame leans to the left of the vehicle, and a left cover member that is provided at least partially between a right surface of the left brake disc and a ground contact point of the right tire and in a position located closer to the left brake disc than the ground contact point of the right tire when the body frame is in the upright state and when the body frame leans to the right of the vehicle.

The inventor has studied extensively the cause for the unbalanced wear of the brake disc or the brake pad of the vehicle that includes the body frame that leans and the two wheels that are aligned in the left-and-right direction. The inventor has discovered from the results of tests carried out repeatedly that the cause for the unbalanced wear is a phenomenon specific to the vehicle that includes the body frame that leans and the two wheels that are aligned in the left-and-right direction.

As has been described above, in general, in the vehicle that includes the body frame that leans and the two wheels that are aligned in the left-and-right direction, when the vehicle turns right, the body frame leans to the right of the vehicle, whereas when the vehicle turns left, the body frame leans to the left of the vehicle. In the vehicle including the body frame that leans and the two wheels that are aligned in the left-and-right direction, a distance defined between the two wheels that are aligned in the left-and-right direction of the body frame is shorter than that of a general four-wheeled vehicle so as to ensure that the body frame leans as required.

Since the distance defined between the two wheels is very short, muddy water containing mud and sand that is thrown up by the left tire of the left wheel scatters towards the right brake disc or the right brake caliper that is provided on the right wheel. Since the distance defined between the two wheels is very short, muddy water containing mud and sand that is thrown up by the right tire of the right wheel scatters towards the left brake disc or the left brake caliper that is provided on the left wheel. Further, since the distance defined between the two wheels is very short, the muddy water containing mud and sand that is thrown up by the left tire of the left wheel and the muddy water containing mud and sand that is thrown up by the right tire of the right wheel tend to stay in a space defined between the two wheels.

In case the muddy water containing mud and sand adheres to the surface of the brake disc, mud and sand intrudes between the brake disc and the brake pads. Then, the wear of the brake pads and the brake disc is promoted by the mud and sand.

A left portion of the right brake device which faces the space defined between the two wheels, wherein the distance defined between the two wheels is very short, is exposed to muddy water containing mud and sand that is thrown up by the left tire or the left tire and the right tire. Additionally, a right portion of the left brake device which faces the space defined between the two wheels, wherein the distance defined between the two wheels is very short, is exposed to muddy water containing mud and sand that is thrown up by the right tire or the right tire and the left tire. On the other hand, a right portion of the right brake device and a left portion of the left brake device do not face the space defined between the two wheels. Because of this, the environments of the right portion and the left portion of each of the brake devices are different. It has been discovered that the different environments cause the phenomenon in which the wear amount differs between the right and left surfaces of the right brake disc, between the right-right brake pad and the right-left brake pad of the right brake caliper, between the right and left surfaces of the left brake disc, and between the left-right brake pad and the left-left brake pad of the left brake caliper.

Further, in the vehicle including the body frame that leans and the two wheels that are aligned in the left-and-right direction, the distance between the right brake device and the ground contact point of the left tire becomes short when the body frame leans to the left of the vehicle. Additionally, the distance between the left brake device and the ground contact point of the left brake device and the ground contact point of the right tire becomes short when the body frame leans to the right of the vehicle. It has been discovered from these facts that the above problem needs to be solved by taking the changes in positional relationship into consideration.

According to a preferred embodiment of the present invention, a vehicle including the body frame that leans and the two wheels that are aligned in the left-and-right direction includes the suspension device that includes the right cover member that is located between the left surface of the right brake disc and the ground contact point of the left tire and in the position located closer to the right brake disc than the ground contact point of the left tire when the body frame is in an upright state and when the body frame leans to the left of the vehicle, and the left cover member that is located between the right surface of the left brake disc and the ground contact point of the right tire and in the position located closer to the left brake disc than the ground contact point of the right tire when the body frame is in the upright state and when the body frame leans to the right of the vehicle.

In the vehicle including the body frame that leans and the two wheels that are aligned in the left-and-right direction, the difference in the environment between the left portion and the right portion of each brake device is reduced by the configuration of the suspension device described above. Consequently, in the vehicle including the body frame that leans and the two wheels that are aligned in the left-and-right direction, unbalanced wear of the brake discs and the brake pads is significantly reduced or prevented.

Specifically, muddy water containing mud and sand that is thrown up by the left tire of the left wheel scatters towards the left surface of the right brake disc and the right-left brake pad. In particular, when the body frame leans to the left of the vehicle, compared with a case where the body frame is in the upright state, the distance between the ground contact point of the left tire and the right brake device becomes short, and therefore, the left surface of the right brake disc or the right-left brake pad tends to be easily splashed with the muddy water containing mud and sand. On the other hand, it is difficult for the right surface of the right brake disc and the right-right brake pad to be splashed with muddy water containing mud and sand that is thrown up by the left tire.

According to a vehicle of a preferred embodiment of the present invention, the right cover member is located between the left surface of the right brake disc and the ground contact point of the left tire and in the position located closer to the right brake disc than the ground contact point of the left tire. This significantly reduces or prevents the left surface of the right brake disc and the right-left brake pad from being splashed with the muddy water containing mud and sand that is thrown up by the left tire. This reduces the degree of adhesion of mud and sand to the left surface of the right brake disc and the right-left brake pad to such an extent that an unbalanced wear is unlikely to occur relative to the degree of adhesion of mud and sand to the right surface of the right brake disc and the right-right brake pad which is originally small.

Additionally, muddy water containing mud and sand that is thrown up by the right tire of the right wheel scatters towards the right surface of the left brake disc and the left-right brake pad. In particular, when the body frame leans to the right of the vehicle, compared with a case where the body frame is in the upright state, the distance between the ground contact point of the right tire and the left brake device becomes short, the right surface of the left brake disc or the left-right brake pad tends to be easily splashed with the muddy water containing mud and sand. On the other hand, it is difficult for the left surface of the left brake disc and the left-left brake pad to be splashed with muddy water containing mud and sand that is thrown up by the right tire.

According to a vehicle of a preferred embodiment of the present invention, the left cover member is located between the right surface of the left brake disc and the ground contact point of the right tire and in the position located closer to the left brake disc than the ground contact point of the right tire. This significantly reduces or prevents the right surface of the left brake disc and the left-right brake pad from being splashed with the muddy water containing mud and sand that is thrown up by the right tire. This reduces the degree of adhesion of mud and sand to the right surface of the left brake disc and the left-right brake pad to such an extent that an unbalanced wear is unlikely to occur relative to the degree of adhesion of mud and sand to the left surface of the left brake disc and the left-left brake pad which is originally small.

Further, the muddy water containing mud and sand that is thrown up by the left tire and the muddy water containing mud and sand that is thrown up by the right tire tend to stay in the space defined between the two wheels, and the left surface of the right brake disc and the right surface of the left brake disc tend to be exposed to the muddy water containing mud and sand. On the other hand, the right surface of the right brake disc and the left surface of the left brake disc are unlikely to be exposed to the muddy water containing mud and sand.

A vehicle according to a preferred embodiment of the present invention includes the right cover member that is located between the left surface of the right brake disc and the ground contact point of the left tire and in the position located closer to the right brake disc than the ground contact point of the left tire, and the left cover member that is located between the right surface of the left brake disc and the ground contact point of the right tire and in the position located closer to the left brake disc than the ground contact point of the right tire when the body frame is in the upright state and when the body frame leans to the right of the vehicle.

This significantly reduces or prevents the left surface of the right brake disc, the right surface of the left brake disc, the right-left brake pad, and the left-right brake pad from being splashed with the muddy water containing mud and sand that stays between the two spaces. By using this configuration, the degree of adhesion of mud and sand to the left surface of the right brake disc, the right surface of the left brake disc, the right-left brake pad, and the left-right brake pad is reduced to such an extent that an unbalanced wear is unlikely to occur relative to the degree of adhesion of mud and sand to the right surface of the right brake disc, the left surface of the left brake disc, the right-right brake pad, and the left-left brake pad which is originally small.

For these reasons, in the vehicle including the body frame that leans and the two wheels that are aligned in the left-and-right direction, the unbalanced wear of the brake discs and the brake pads is significantly reduced or prevented.

In a vehicle according to a preferred embodiment of the present invention, the following configurations are preferably used.

At least a portion of the right cover member is located between the ground contact point of the left tire and the left surface of the right brake disc that is positioned behind the ground contact point of the left tire in relation to a front-and-rear direction of the body frame when the body frame is in the upright state, and at least a portion of the left cover member is located between the ground contact point of the right tire and the right surface of the left brake disc that is positioned behind the ground contact point of the right tire in relation to the front-and-rear direction of the body frame when the body frame is in the upright state.

The left tire throws up muddy water towards the rear from the ground contact point thereof. It is possible to significantly reduce or prevent muddy water that is thrown up to the rear from the ground contact point of the left tire by the left tire from splashing the left surface of the right brake disc by at least a portion of the right cover member that is located between the ground contact point of the left tire and the left surface of the right brake disc that is positioned behind the ground contact point of the left tire.

The right tire throws up muddy water towards the rear from the ground contact point thereof. It is possible to significantly reduce or prevent muddy water that is thrown up to the rear from the ground contact point of the right tire by the right tire from splashing the right surface of the left brake disc by at least a portion of the left cover member that is located between the ground contact point of the right tire and the right surface of the left brake disc that is positioned behind the ground contact point of the right tire.

This significantly reduces or prevents the occurrence of an unbalanced wear of the brake discs.

At least a portion of the right cover member is located between the right wheel and the ground contact point of the left tire when the body frame is in the upright state and when the body frame leans to the left of the vehicle, and at least a portion of the left cover member is located between the left wheel and the ground contact point of the right tire when the body frame in the upright state and when the body frame leans to the right of the vehicle.

In the event that the right brake disc is positioned on the right of the right wheel member, although it is possible to prevent muddy water thrown up by the left tire from splashing the right brake disc and the right-left brake pad by the right wheel member, this effect cannot be expected in the case of the right brake disc being positioned on the left of the right wheel member. According to a vehicle of a preferred embodiment of the present invention, however, even in the event that the right brake disc is positioned on the left of the right wheel member, it is possible to significantly reduce or prevent the muddy water thrown up by the left tire from splashing the right brake disc by at least a portion of the right cover member that is located between the right wheel member and the ground contact of the left tire.

In the event that the left brake disc is positioned on the left of the left wheel member, although it is possible to prevent muddy water thrown up by the right tire from splashing the left brake disc and the left-right brake pad by the left wheel member, this effect cannot be expected in the case of the left brake disc being positioned on the right of the left wheel member. According to a vehicle of a preferred embodiment of the present invention, however, even in the event that the left brake disc is positioned on the right of the left wheel member, it is possible to significantly reduce or prevent the muddy water thrown up by the right tire from splashing the left brake disc by at least a portion of the left cover member that is located between the left wheel member and the ground contact of the right tire.

This significantly reduces or prevents the occurrence of an unbalanced wear of the brake discs.

In a vehicle according to a preferred embodiment of the present invention, the following configurations are preferably used. The vehicle includes a wheel rotating speed detector including a detected portion that rotates together with at least one of the right wheel and the left wheel and a detecting portion that is provided on the suspension device and that measures a rotating speed of at least the one of the right wheel and the left wheel, and at least a portion of the right cover member and/or the left cover member is located between a portion of the detected portion that rotates together with the right wheel or the detecting portion and the ground contact point of the left tire and in a position that is located closer to the portion of the detected portion that rotates together with the right wheel or the detecting portion than the ground contact point of the left tire when the body frame is in the upright state and when the body frame leans to the left of the vehicle and/or is located between a portion of the detected portion that rotates together with the left wheel or the detecting portion and the ground contact point of the right tire and in a position that is located closer to the portion of the detected portion that rotates together with the left wheel or the detecting portion than the ground contact point of the right tire when the body frame is in the upright state and when the body frame leans to the right of the vehicle.

The right cover member and/or the left cover member significantly reduce or prevent an unbalanced wear of the brake disc and the brake pad and also significantly reduce or prevent the muddy water from splashing the wheel rotating speed detector.

In a vehicle according to a preferred embodiment of the present invention, the following configurations are preferably used. The suspension device preferably includes aright telescopic element that supports the right wheel so that the right wheel is displaced linearly and a left telescopic element that supports the left wheel so that the left wheel is displaced linearly, the right wheel, the right brake caliper, and the right cover member are supported at a lower portion of the right telescopic element, and the left wheel, the left brake caliper, and the left cover member are supported at a lower portion of the left telescopic element.

According to a vehicle of a preferred embodiment of the present invention, the right wheel, the right brake caliper, and the right cover member are supported at the lower portion of the right telescopic element. Because of this, even in case the right wheel is displaced linearly by the right telescopic element, the right cover is displaced in the same manner as the right brake disc and the right brake caliper that are provided on the right wheel, and therefore, the right cover has a high following capability. This enables the right cover member that is small in size to efficiently significantly reduce or prevent the adhesion of muddy water to the right brake disc and the right-left brake pad.

According to a vehicle of a preferred embodiment of the present invention, the left wheel, the left brake caliper, and the left cover member are supported at the lower portion of the left telescopic element. Because of this, even in case the left wheel is displaced linearly by the left telescopic element, the left cover is displaced in the same manner as the left brake disc and the left brake caliper that are provided on the left wheel, and therefore, the left cover has a high following capability. This enables the left cover member that is small in size to efficiently significantly reduce or prevent the adhesion of muddy water to the left brake disc and the left-right brake pad.

In vehicles according to various preferred embodiments of the present invention, the following configurations are preferably used.

The suspension device preferably includes a right front telescopic element and a right rear telescopic element that support the right wheel so that the right wheel is displaced linearly and that are disposed so as to be aligned in the front-and-rear direction of the body frame, and a left front telescopic element and a left rear telescopic element that support the left wheel so that the left wheel is displaced linearly and that are disposed so as to be aligned in the front-and-rear direction of the body frame.

An exposed area of the right brake disc as viewed from the ground contact point of the left tire is easily reduced by the right front telescopic element and the right rear telescopic element. By using this configuration, it is easy to significantly reduce or prevent muddy water thrown up by the left tire from splashing the right brake disc.

An exposed area of the left brake disc as viewed from the ground contact point of the right tire is easily reduced by the left front telescopic element and the left rear telescopic element. By using this configuration, it is easy to significantly reduce or prevent muddy water thrown up by the right tire from splashing the left brake disc.

In vehicles according to various preferred embodiments of the present invention, the following configurations are preferably used.

The right wheel is a right front wheel, and the left wheel is a left front wheel.

It is preferable that a front wheel has a larger braking capacity than that of a rear wheel. Because of this, a large brake disc is provided on the front wheel on many occasions. A brake disc having a large surface area tends to be exposed to water, and therefore, the probability that an unbalanced wear occurs tends to be increased. According to a vehicle of a preferred embodiment of the present invention, the right cover member and the left cover member significantly reduce or prevent the unbalanced wear of the brake discs.

In a vehicle according to a preferred embodiment of the present invention, the following configurations are preferably used.

The suspension device preferably includes a right shock absorbing device which supports the right wheel at a lower portion thereof and absorbs an upward displacement of the right wheel in an up-and-down direction of the body frame, a left shock absorbing device which supports the left wheel at a lower portion thereof and absorbs an upward displacement of the left wheel in the up-and-down direction of the body frame; and a link mechanism including a right side portion that supports an upper portion of the right shock absorbing device so as to rotate about a right steering axis that extends in the up-and-down direction of the body frame, a left side portion that supports an upper portion of the left shock absorbing device so as to rotate about a left steering axis that is parallel to the right steering axis, an upper cross portion that supports at a right end portion thereof an upper portion of the right side portion so as to rotate about an upper right axis that extends in the front-and-rear direction of the body frame and supports at a left end portion thereof an upper portion of the left side portion so as to turn about an upper left axis that is parallel to the upper right axis and that is supported at a middle portion thereof on the body frame so as to turn about an upper middle axis that is parallel to the upper right axis and the upper left axis, and a lower cross portion that supports at a right end portion thereof a lower portion of the right side portion so as to turn about a lower right axis that is parallel to the upper right axis and supports at a left end portion thereof a lower portion of the left side portion so as to turn about a lower left axis that is parallel to the upper left axis and that is supported at a middle portion thereof on the body frame so as to turn about a lower middle axis that is parallel to the upper middle axis.

In the event that a so-called parallelogram link mechanism is installed in the vehicle, the link mechanism is positioned above the right wheel and the left wheel to reduce the left-and-right distance between the two wheels, thus making it possible that the vehicle is compact in relation to a width thereof. However, in the event that the distance between the two wheels is short, as has been described above, it becomes easy for muddy water containing mud and sand that is thrown up by the two wheels to adhere to the right brake device and the left brake device, thus promoting the occurrence of an unbalanced wear of the brake discs and the brake pads. However, providing the cover members according to a preferred embodiment of the present invention significantly reduces or prevents the occurrence of such an unbalanced wear.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a vehicle according to the present invention will be described by reference to the accompanying drawings.

In the preferred embodiments, the vehicle will be described as being a vehicle including two front wheels and one rear wheel.

Figure 1:
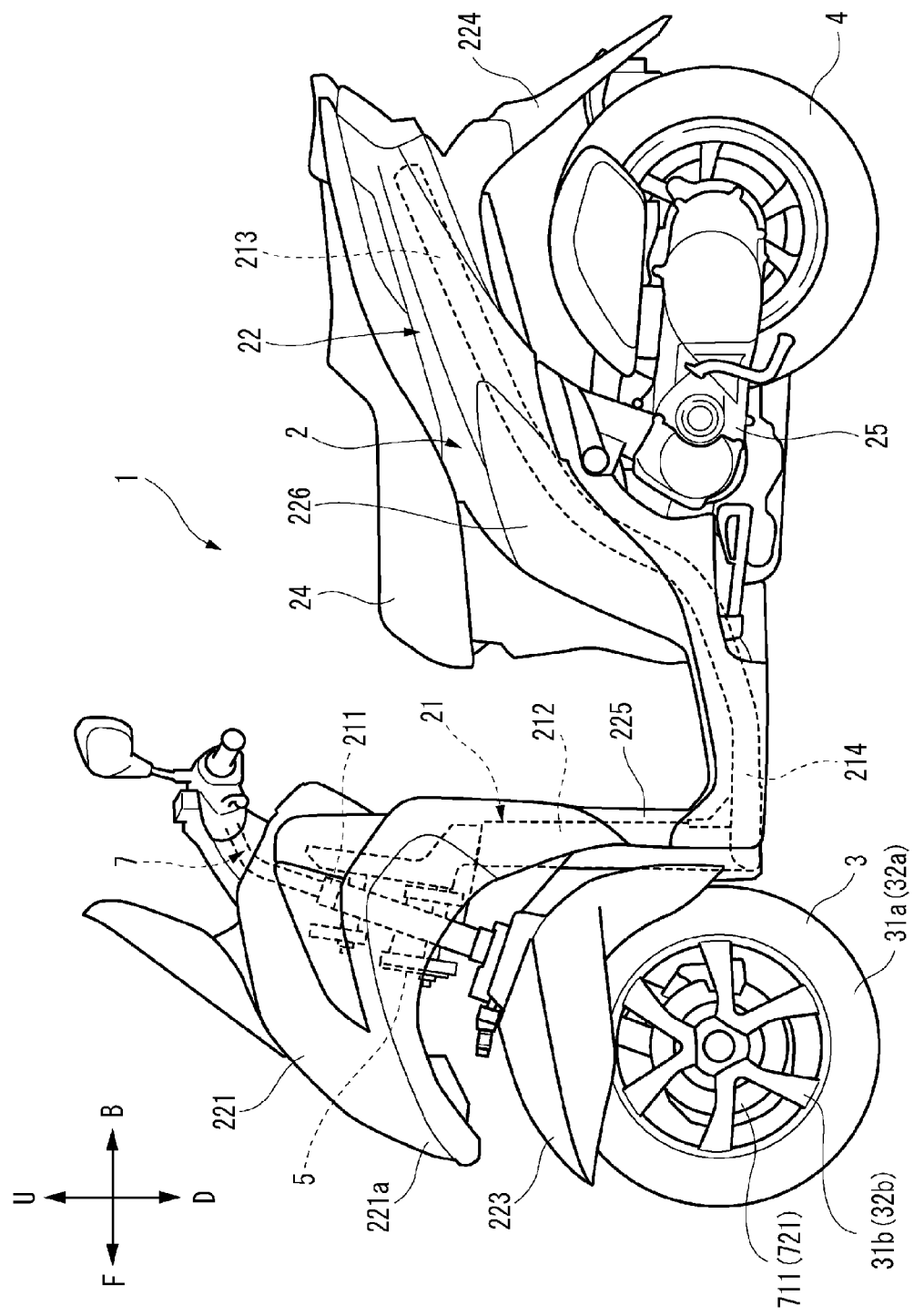
FIG. 1 is an overall side view of a vehicle according to a preferred embodiment of the present invention.

FIG. 1 is a side view of the whole of a vehicle 1 as viewed from the left thereof. Hereinafter, in the drawings, an arrow F denotes a forward direction of the vehicle 1 and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward, and rightward directions as seen from a rider of the vehicle 1. A center in a vehicle's width direction means a central position of the vehicle 1 in the vehicle's width direction. The right in the vehicle's width direction means a direction directed from the center in the vehicle's width direction towards the right. The left in the vehicle's width direction means a direction directed from the center in the vehicle's width direction towards the left. An up-and-down direction means a vertical direction and also a substantially up-and-down direction which inclines from the vertical direction. A left-and-right direction means a horizontal direction and also a substantially left-and-right direction which inclines from the horizontal direction. An unloaded state of the vehicle means a state in which the vehicle 1 is in the upright state with front wheels neither steered nor caused to lean when no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The headstock 211 is disposed at a front portion of the vehicle 1. When the vehicle 1 is viewed from a side thereof, the headstock 211 is slightly inclined relative to a vertical direction so that an upper portion is positioned slightly further rearwards than a lower portion thereof. The steering mechanism 7 and the link mechanism 5 are disposed around the headstock 211. A steering shaft 60 of the steering mechanism 7 is inserted into the headstock 211 so as to be turned therein. The headstock 211 supports the link mechanism 5. The headstock 211, which is a portion of the body frame 21, leans to the right of the vehicle 1 when the vehicle 1 turns right, whereas the headstock 211 leans to the left of the vehicle 1 when the vehicle 1 turns left.

The down frame 212 is connected to the headstock 211. The down frame 212 is disposed behind the headstock 211 and extends along the up-and-down direction. The under frame 214 is connected to a lower portion of the down frame 212. The under frame 214 extends rearwards from the lower portion of the down frame 212. The rear frame 213 is disposed behind the under frame 214 and extends obliquely rearwards and upwards. The rear frame 213 supports the seat 24, the power unit 25, a tail lamp and the like.

The body frame 21 is covered by the body cover 22. The body cover 22 includes a front cover 221, a pair of left and right mudguards 223, a leg shield 225, a center cover 226, and a rear mudguard 224.

The front cover 221 is positioned ahead of the seat 24. The front cover 221 covers at least a portions of the steering mechanism 7 and the link mechanism 5. The front cover 221 includes a front portion 221a that is disposed ahead of the link mechanism 5. In a side view of the vehicle 1 in an unloaded state, the front portion 221a of the front cover 221 is provided above the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 covers the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed directly below the center cover 226 and the rear mudguard 224.

Figure 2:
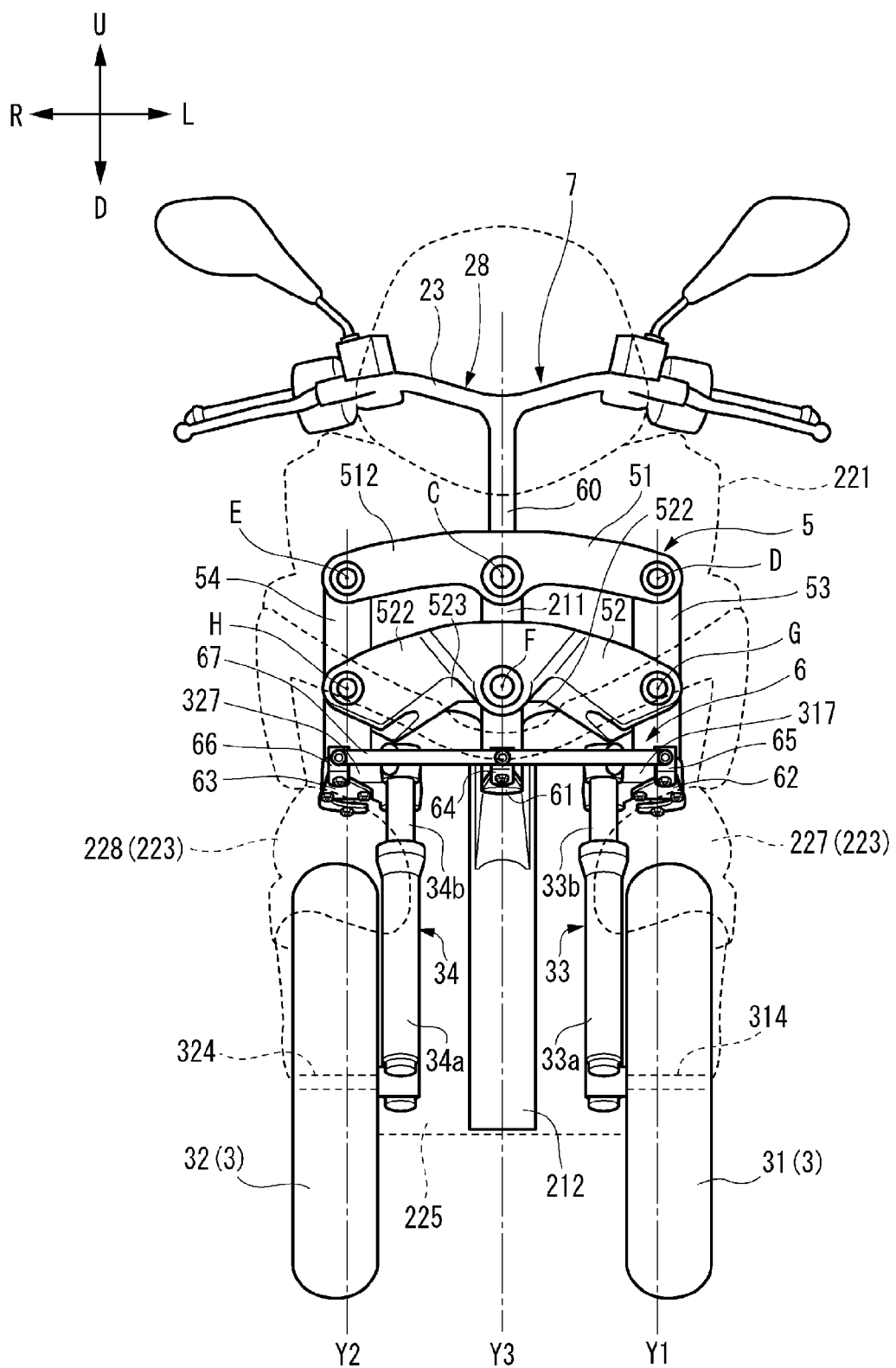
FIG. 2 is a front view of a front portion of the vehicle shown in FIG. 1.
Figure 3:
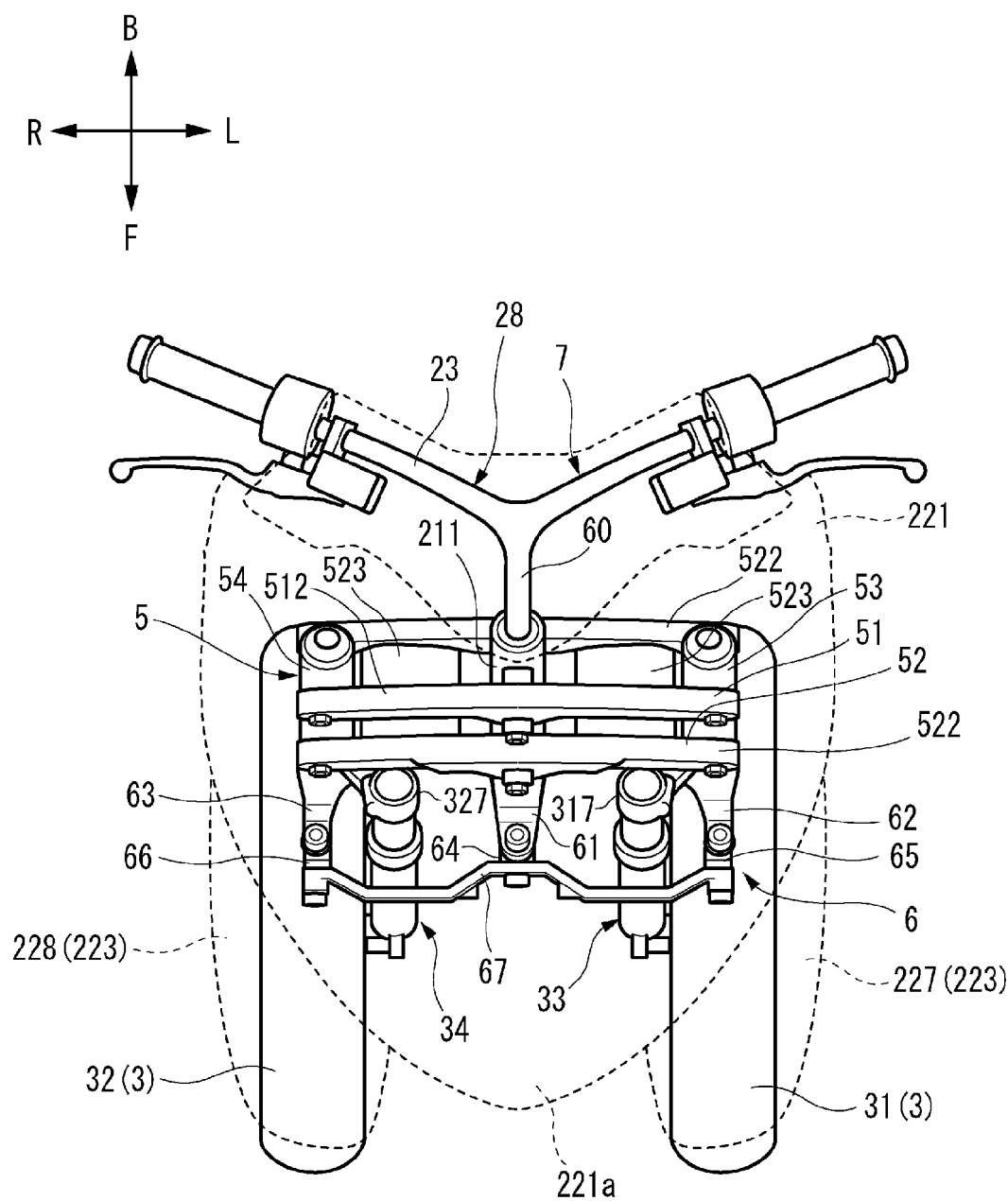
FIG. 3 is a plan view of the front portion of the vehicle shown in FIG. 1.

FIG. 2 is a front view of the front portion of the vehicle 1 shown in FIG. 1 when viewed from the front thereof. FIG. 3 is a plan view of the front portion of the vehicle 1 shown in FIG. 1 when viewed from thereabove. FIGS. 2 and 3 show the front portion of the vehicle 1 as seen through the body cover 22.

As shown in FIGS. 2 and 3, the steering mechanism 7 includes a steering effort transmission mechanism 6, a suspension device, and the pair of left and right front wheels 3. The suspension device includes the link mechanism 5, a left shock absorber 33, and a right shock absorber 34. The suspension device supports a left front wheel 31 and a right front wheel 32 on the body frame 21.

The pair of right and left front wheels 3 includes the left front wheel 31 and the right front wheel 32. The left front wheel 31 and the right front wheel 32 are aligned in a left-and-right of the body frame 21. The left front wheel 31 and the right front wheel 32 are disposed symmetrically in the left-and-right direction with respect to a center of the vehicle in relation to the vehicle's width direction. In addition, of the pair of left and right front mudguards 223, a first front mudguard 227 is disposed directly above the left front wheel 31. Of the pair of left and right front mudguards 223, a second front mudguard 228 is disposed directly above the right wheel 32. The left front wheel 31 is supported by the left shock absorber 33. The right front wheel 32 is supported by the right shock absorber 34.

As shown in FIG. 1, the left front wheel 31 includes a left tire 31a and a left wheel member 31b. The left front wheel member 31b supports the left tire 31a and rotates together with a left brake disc 711, which will be described later. The right front wheel 32 includes a right tire 32a and a right wheel member 32b. The right front wheel member 32b supports the right tire 32a and rotates together with a right brake disc 721, which will be described later.

Figure 5:
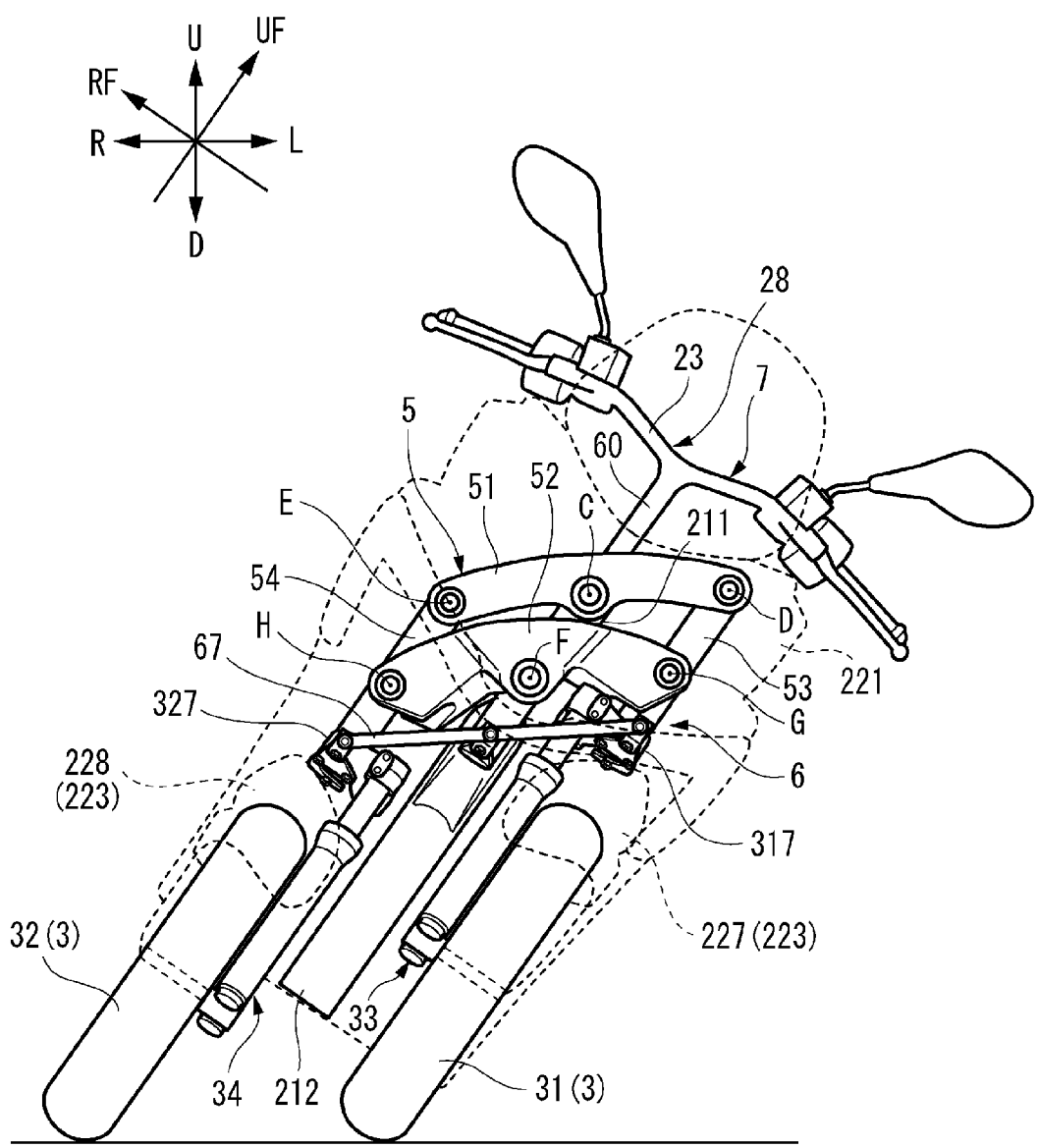
FIG. 5 is a front view of the front portion of the vehicle in a state where the vehicle shown in FIG. 1 is caused to lean.

In this description, the "left-and-right direction of the body frame 21" denotes a direction that intersects at right angles or perpendicular or substantially perpendicular to an axial direction of the headstock 211 when the vehicle 1 is viewed from the front thereof. Additionally, an up-and-down direction of the body frame 21 denotes a direction which extends in the axial direction of the headstock 211 when the vehicle 1 is viewed from the front thereof For example, the up-and-down direction of the body frame 21 coincides with the axial direction of the headstock 211 when the vehicle 1 is viewed from the front thereof. As shown in FIG. 2, when the vehicle 1 is in an upright state, a rightward direction RF of the body frame 21 coincides with a rightward direction R in a horizontal direction when the vehicle 1 is viewed front the front thereof. Because of this, only the rightward direction R in the horizontal direction is shown in FIG. 2. As shown in FIG. 5, when the vehicle 1 leans relative to a road surface, when the vehicle 1 is viewed from the front thereof, the rightward direction RF of the body frame 21 does not coincide with the rightward direction R in the horizontal direction, and an upward direction UF of the body frame 21 does not coincide with an upward direction U in the vertical direction.

The left shock absorber 33 is preferably a so-called telescopic shock absorber and dampens vibrations from the road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The first upper-side portion 33b is disposed at an upper side of the first lower-side portion 33a when the first upper-side portion 33b is partially inserted into the first lower-side portion 33a. The first upper-side portion 33b moves relative to the first lower-side portion 33a in a direction in which the first lower-side portion 33a extends. An upper portion of the first upper-side portion 33b is fixed to a first bracket 317.

The first lower-side portion 33a and the first upper-side portion 33b define two telescopic elements that are aligned parallel in the front-and-rear direction and are connected together. This configuration prevents the first upper-side portion 33b from turning relative to the first lower-side portion 33a.

The right shock absorber 34 is preferably a so-called telescopic shock absorber and dampens vibrations from the road surface. The left shock absorber 34 supports the right front wheel 32 at a lower portion thereof and absorbs an upward displacement of the right front wheel 32 in the up-and-down direction of the body frame 21. The right shock absorber 34 includes a second lower-side portion 34a and a second upper-side portion 34b. The right front wheel 32 is supported on the second lower-side portion 34a. The second lower-side portion 34a extends in the up-and-down direction, and a right wheel axle 324 is supported on a lower end side of the second lower-side portion 34a. The right wheel axle 324 supports the right front wheel 32. The second upper-side portion 34b is disposed at an upper side of the second lower-side portion 34a when the second upper-side portion 34b is partially inserted into the second lower-side portion 34a. The second upper-side portion 34b moves relative to the second lower-side portion 34a in a direction in which the second lower-side portion 34a extends. An upper portion of the second upper-side portion 34b is fixed to a second bracket 327.

The second lower-side portion 34a and the second upper-side portion 34b define two telescopic elements that are aligned parallel in the front-and-rear direction and are connected together. This configuration prevents the second upper-side portion 34b from turning relative to the second lower-side portion 34a.

The steering effort transmission mechanism 6 is disposed above the left front wheel 31 and the right front wheel 32. The steering effort transmission mechanism 6 includes a steering member 28 as a member which inputs a steering effort made by the rider. The steering member 28 includes the steering shaft 60 and a handlebar 23 that is connected to an upper portion of the steering shaft 60. The steering shaft 60 is disposed so that the steering shaft 60 is partially inserted into the headstock 211 and extends substantially in the up-and-down direction. The steering shaft 60 is turned relative to the headstock 211. The steering shaft 60 is turned in association with the rider turning the handlebar 23.

The steering effort transmission mechanism 6 includes, in addition to the steering member 28, a first transmission plate 61, a second transmission plate 62, a third transmission plate 63, a first joint 64, a second joint 65, a third joint 66, a tie-rod 67, the first bracket 317, and the second bracket 327. The steering effort transmission mechanism 6 transmits the steering effort by which the rider operates the handlebar 23 to the first bracket 317 and the second bracket 327 by way of those constituent members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be below later, so as to turn relatively. The second transmission plate 62 is fixed to the first bracket 317. The second transfer plate 62 is disposed below the first bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is preferably disposed symmetrical with the second transmission plate 62 in the left-and-right direction with respect to the first transmission plate 61. The third transmission plate 63 is fixed to the second bracket 327. The third transfer plate 63 is positioned below the second bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie rod 67 extends in the vehicle's width direction. The tie-rod 67 is supported so as to turn relative to the shaft portions that extend in the front-and-rear direction at the front portions of the first joint 64, the second joint 65, and the third joint 66.

The steering effort transmission mechanism 6 transmits the steering effort transmitted from the steering member 28 to the tie rod 67 by way of the first transmission plate 61 and the first joint 64. This causes the tie rod 67 to be displaced either leftwards or rightwards. The steering effort transmitted to the tie rod 67 is transmitted from the tie rod 67 to the first bracket 317 byway of the second transmission plate 62 and the second joint 65 and is also transmitted from the tie rod 67 to the second bracket 327 by way of the third transmission plate 63 and the third joint 66. As a result, the first bracket 317 and the second bracket 327 are turned in the direction in which the tie-rod 67 is displaced.

In the present preferred embodiment, the link mechanism 5 preferably uses a four-joint parallel link system (also, called a parallelogram link).

The link mechanism 5 defines a portion of the suspension device. The link mechanism 5 is disposed below the handlebar 23. The link mechanism 5 is connected to the headstock 211 of the body frame 21. The link mechanism 5 includes an upper cross portion 51, a lower cross portion 52, the left side portion 53, and the right side portion 54 as a configuration which enables the vehicle 1 to lean. Additionally, the link mechanism 5 includes the first bracket 317 and the left shock absorber 33 as a configuration that is connected to a lower portion of the left side portion 53 so as to lean together with the left side portion 53. Further, the link mechanism 5 includes the second bracket 327 and the right shock absorber 34 as a configuration that is connected to a lower portion of the right side portion 54 so as to lean together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross member 51 supports at a right end portion thereof an upper portion of the right side portion 54 so as to turn about an upper right axis E that extends in the front-and-rear direction of the body frame 21, and supports at a left end portion thereof an upper portion of the left side portion 53 so as to turn about an upper left axis D that is parallel to the upper right axis E, and is supported at a middle portion thereof on the body frame 21 so as to turn about an upper middle axis C that is parallel to the upper right axis E and the upper left axis D.

The lower cross member 52 supports at a right end portion thereof a lower portion of the right side portion 54 so as to turn about a lower right axis H that is parallel to the upper right axis E, and supports at a left end portion thereof a lower portion of the left side portion 53 so as to turn about a lower left axis G that is parallel to the upper left axis D, and is supported at a middle portion thereof on the body frame 21 so as to turn about a lower middle axis F that is parallel to the upper middle axis C.

The upper cross portion 51 includes a plate-shaped member 512. This plate-shaped member 512 is disposed directly ahead of the headstock 211 and extends in the vehicle's width direction. The plate-shaped member 512 is supported on the headstock 211 by a supporting portion and turns relative to the headstock 211 about the upper middle axis C that extends substantially in the front-and-rear direction.

A left end of the upper cross portion 51 is connected to the left side portion 53 by a supporting portion. The upper cross portion 51 turns relative to the left side portion 53 about the upper left axis D that extends substantially in the front-and-rear direction. A right end of the upper cross portion 51 is connected to the right side portion 54 by a connecting portion. The upper cross portion 51 turns relative to the right side portion 54 about the upper right axis E that extends substantially in the front-and-rear direction.

The lower cross portion 52 is supported on the headstock 211 by a supporting portion and turns about the lower middle axis F that extends substantially in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 hold the headstock 211 therebetween in the front-and-rear direction. The pair of plate-shaped members 522, 522 is connected integrally to each other by a middle portion 523. The middle portion 523 may be integral with or separate from the pair of plate-shaped members 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 about the lower right axis H that extends substantially in the front-and-rear direction.

The left side portion 53 is disposed directly on the left of the headstock 211 and extends parallel to the direction in which the headstock 211 extends. The left side portion 53 is disposed directly above the left front wheel 31 and above the left shock absorber 33. The left side portion 53 is connected to the first bracket 317 at the lower portion thereof and is attached to the first bracket 317 so as to turn about the left steering axis Y1.

The right side portion 54 is disposed directly on the right of the headstock 211 and extends in the direction in which the headstock 211 extends. The right side portion 54 is disposed directly above the right front wheel 32 and above the right shock absorber 34. The right side portion 54 is connected to the second bracket 327 at the lower portion thereof and is attached to the second bracket 327 so as to turn about the right steering axis Y2.

In this manner, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
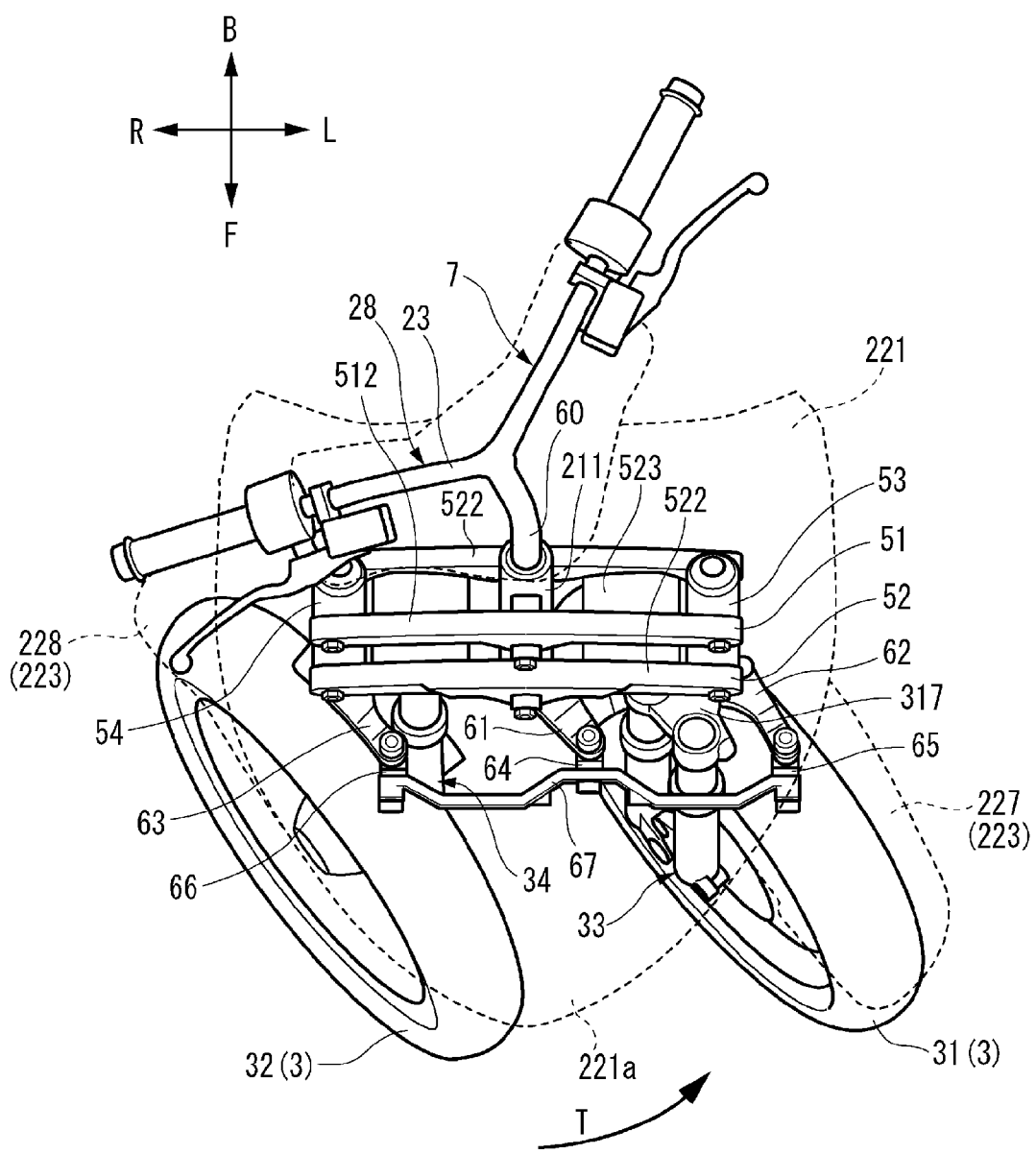
FIG. 4 is a plan view of the front portion of the vehicle in a state where the vehicle shown in FIG. 1 is steered.

FIG. 4 is a plan view of the front portion of the vehicle 1 when the vehicle 1 is steered to be turned, depicting the steering operation of the vehicle 1.

As shown in FIG. 4, when the handlebar 23 is turned left or right, the steering effort transmission mechanism 6 of the steering mechanism 7 is activated to perform a steering operation. When the steering shaft 60 turns as a result of the handlebar 23 being turned, the first transmission plate 61 turns as the steering shaft 60 turns.

For example, when the steering shaft 60 turns in a direction indicated by an arrow T in FIG. 4, the tie-rod 67 moves leftwards and rearwards in association with the turning of the first transmission plate 61. As this occurs, the first transmission plate 61 is allowed to turn relative to the first joint 64 by the turning shaft of the first joint 64 that extends substantially in the up-and-down direction, and the tie-rod 67 moves leftwards and rearwards while maintaining its posture. The second transmission plate 62 and the third transmission plate 63 turn in the direction indicated by the arrow T about the left side portion 53 and the right side portion 54, respectively, as the tie-rod 67 moves leftwards and rearwards. As this occurs, the second transmission plate 62 turns relative to the second joint 65 about the rotating shaft of the second joint 65 that extends in the up-and-down direction, and the third transmission plate 63 turns relative to the third joint 66 about the rotating shaft of the third joint 66 that extends in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorber 33, and the right front wheel 32 turns about the right steering axis Y2 (refer to FIG. 2) via the right shock absorber 34.

FIG. 5 is a front view of the front portion of the vehicle 1 when the vehicle 1 is steered to be turned, depicting a leaning operation of the vehicle 1.

As shown in FIG. 5, the vehicle 1 leans to the left or right as the link mechanism 5 operates. The operation of the link mechanism 5 means that the individual members (the upper cross portion 51, the lower cross portion 52, the left side portion 53 and the right side portion 54) that activate a leaning operation in the link mechanism 5 turn relatively about their connecting points as axes so as to change the shape of the link mechanism 5.

In the link mechanism 5 of the present preferred embodiment, for example, the upper cross portion 51, the lower cross portion 52, the left side portion 53, and the right side portion 54 which are disposed so as to define a rectangular or substantially rectangular shape when viewed from the front with the vehicle 1 being in the upright state turn to change their shape into a parallelogram shape when the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For example, when the rider causes the vehicle 1 to lean to the left, the headstock 211 leans to the left of the vehicle 1 from the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves farther leftwards than the lower cross portion 52, and the left side portion 53 and the right side portion 54 lean from the vertical direction while being kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

In addition, during the leaning operation, the tie-rod 67 turns relative to the shaft portions of the first joint 64, the second joint 65, and the third joint 66 that extend in the front-and-rear direction. This allows the tie rod 67 to maintain its parallel posture to the upper cross portion 51 and the second cross portion 52 even though the vehicle 1 leans.

In this manner, the link mechanism 5 leans to cause the left front wheel 31 and the right front wheel 32 to lean and is disposed directly above the left front wheel 31 and the right front wheel 32. Namely, the turning shafts of the upper cross portion 51, the lower cross portion 52, the left side portion 53 and the right side portion 54 that are turning members that define the link mechanism 5 are disposed above the left front wheel 31 and the right front wheel 32.

Figure 6:
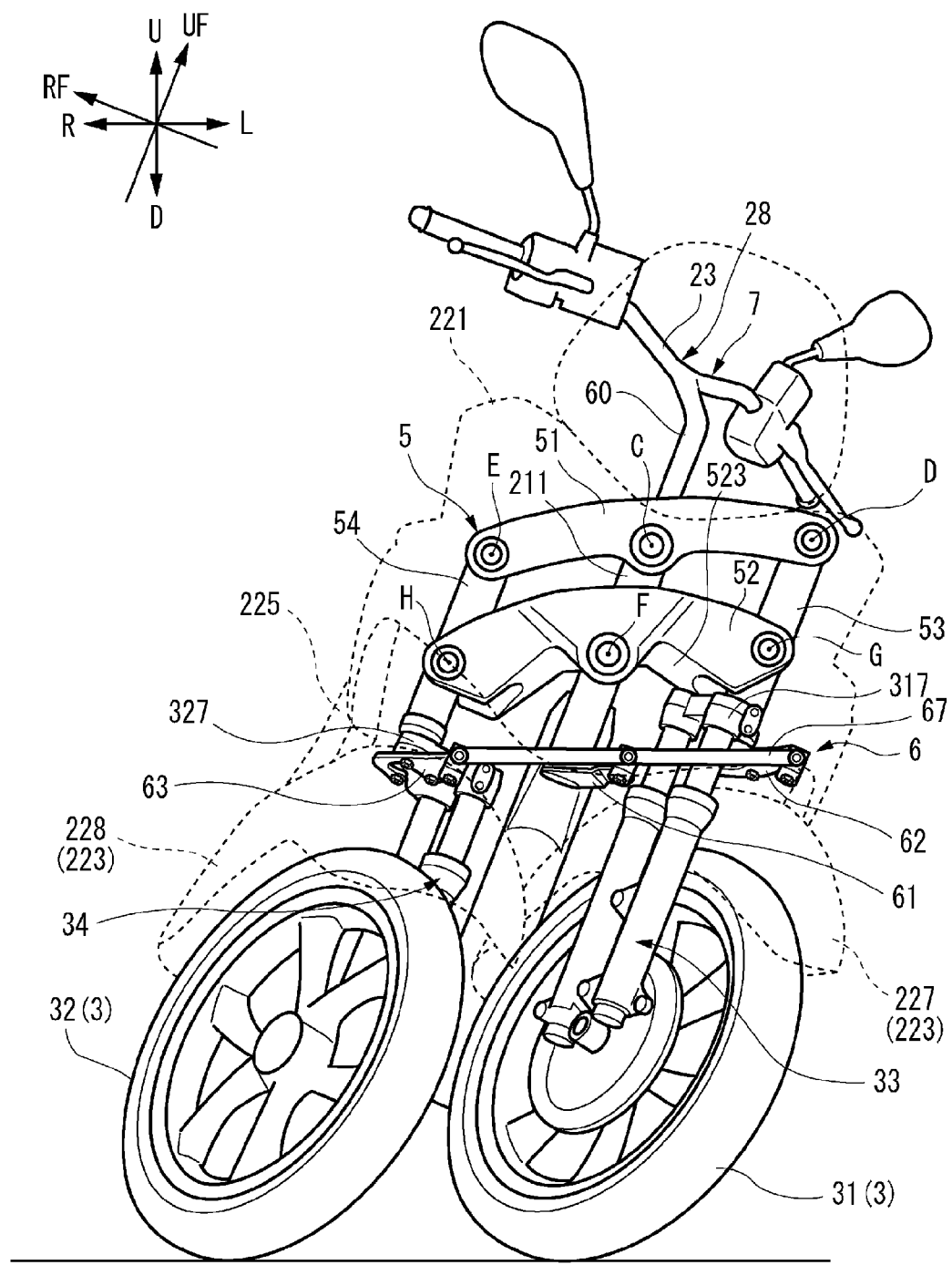
FIG. 6 is a front view of the front portion of the vehicle in a state where the vehicle shown in FIG. 1 is steered and is caused to lean.

FIG. 6 is a front view of the front portion of the vehicle 1 when the vehicle 1 is steered and caused to lean.

In FIG. 6, the vehicle 1 is steered to the left and is caused to lean to the left thereof. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53 and the right side portion 54 of the link mechanism 5 are turned to change their shape into a parallelogram, so that the tie-rod 67 moves leftwards or rightwards, that is, in a direction in which the vehicle 1 is steered (leftwards in FIG. 6) and rearwards.

Figure 7:
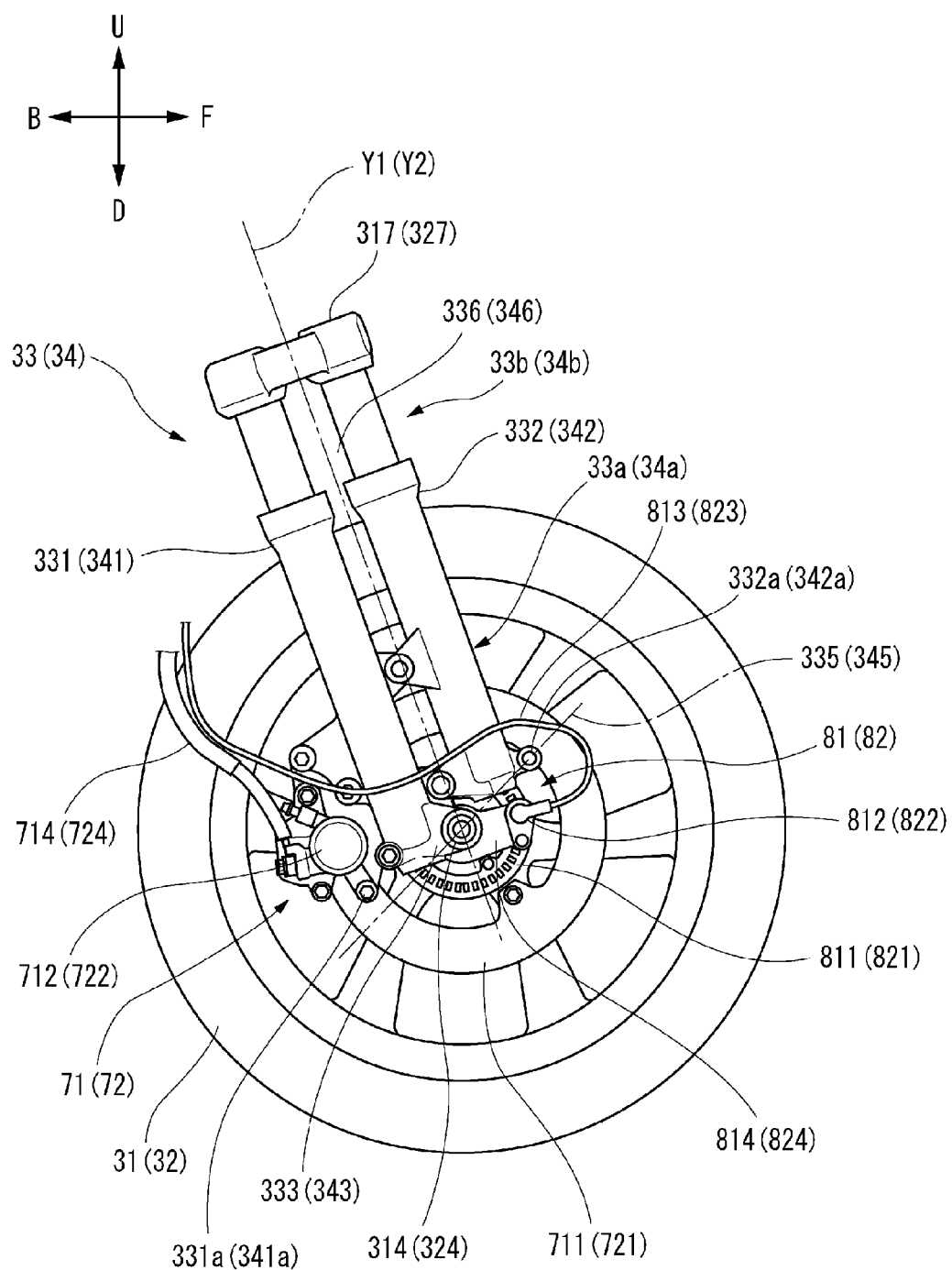
FIG. 7 is a side view of a left front wheel as viewed from a right front wheel with a cover member of the vehicle shown in FIG. 1 removed.

FIG. 7 is a side view of the left front wheel 31 as viewed from the right front wheel 32 with a cover member of the vehicle shown in FIG. 1 removed. In FIG. 7, only the left front wheel 31 and members provided therearound are shown, and as to the right front wheel 32 and members provided therearound, only reference numerals denoting the right front wheel 32 and members provided therearound are given, and the illustration thereof is omitted here. In this preferred embodiment, the shapes and positional relationship of the right front wheel 32 and the members that are disposed therearound are symmetrical laterally with the shapes and positional relationship of the left front wheel 31 and the members that are disposed therearound. Thus, as matter of convenience, the right front wheel 32 and the members provided therearound will be described by reference to FIG. 7.

The suspension device includes a left telescopic element which supports the left front wheel 31 so as to be displaced linearly and a right telescopic element which supports the right front wheel 32 so as to be displaced linearly.

As shown in FIG. 7, the left shock absorber 33, which defines a portion of the suspension device, includes the first lower-side portion 33a and the first upper-side portion 33b. The first lower-side portion 33a and the first upper-side portion 33b include a left rear telescopic element 331 and a left front telescopic element 332 that are aligned parallel in the front-and-rear direction and are connected together. The left telescopic element includes the left rear telescopic element 331 and the left front telescopic element 332. The left rear telescopic element 331 and the left front telescopic element 332 are disposed farther rightwards of the body frame 21 than the left front wheel 31.

The left rear telescopic element 331 has an extending and contracting construction in which the left rear telescopic element 331 extends and contracts substantially along the left steering axis Y1. An elastic member (not shown) such as a spring and a damping member (not shown) such as oil or the like are provided in an interior of the left rear telescopic element 331. The left rear telescopic element 331 has a function to absorb vibrations or impacts from the left front wheel 31.

The left front telescopic element 332 is disposed ahead of the left rear telescopic element 331. The left front telescopic element 332 has an extending and contracting construction in which the left front telescopic element 332 extends and contracts substantially along the left steering axis Y1.

Upper portions of the left rear telescopic element 331 and the left front telescopic element 332 are connected together by the first bracket 317. A lower end portion of the left front telescopic element 332 is fixedly connected to the vicinity of a lower end portion of the left rear telescopic element 331. The left wheel axle 314 of the left front wheel 31 is provided at the lower end portion of the left rear telescopic element 331.

The left front telescopic element 332 is shorter than the left rear telescopic element 331 in the direction of the left steering axis Y1. A left wheel axle supporting portion 333 that supports rotatably the left wheel axle 314 is disposed below the lower end portion of the left front telescopic element 332. The left wheel axle supporting portion 333 is connected to the left rear telescopic element 331.

The right shock absorber 34 that defines a portion of the suspension device includes the second lower-side portion 34*a* and the second upper-side portion 34*b*. The second lower-side portion 34*a* and the second upper-side portion 34*b* include a right rear telescopic element 341 and a right front telescopic element 342 that are aligned parallel in the front-and-rear direction and are connected together. The right telescopic element includes the right rear telescopic element 341 and the right front telescopic element 342. The right rear telescopic element 341 and the right front telescopic element 342 are disposed farther leftwards of the body frame 21 than the right front wheel 32.

The right rear telescopic element 341 has an extending and contracting construction in which the right rear telescopic element 334 extends and contracts substantially along the right steering axis Y2. An elastic member (not shown) such as a spring and a damping member (not shown) such as oil or the like are provided in an interior of the right rear telescopic element 341. The right rear telescopic element 341 has a function to absorb vibrations or impacts from the right front wheel 32.

The right front telescopic element 342 is disposed ahead of the right rear telescopic element 341. The right front telescopic element 342 has an extending and contracting construction in which the right front telescopic element 342 extends and contracts substantially along the right steering axis Y2. Upper portions of the right rear telescopic element 341 and the right front telescopic element 342 are connected together by the second bracket 327. A lower end portion of the right front telescopic element 342 is fixedly connected to the vicinity of a lower end portion of the right rear telescopic element 341. The right wheel axle 324 of the right front wheel 32 is provided at the lower end portion of the right rear telescopic element 341.

The right front telescopic element 342 is shorter than the right rear telescopic element 341 in the direction of the right steering axis Y2. A right wheel axle supporting portion 343 that supports rotatably the right wheel axle 324 is disposed below the lower end portion of the right front telescopic element 342. The right wheel axle supporting portion 343 is connected to the right rear telescopic element 341.

As shown in FIG. 7, a left disc brake 71 (an example of a left brake device) is provided on the left front wheel 31. The left disc brake 71 brakes the left front wheel 31. The left disc brake 71 includes a left brake disc 711 that is provided on the left front wheel 31 and a left brake caliper 712 that brakes the rotation of the left brake disc 711.

The left brake disc 711 preferably has a ring shape which is centered at the left wheel axle 314. The left brake disc 711 is fixed to the left front wheel 31.

The left brake caliper 712 is provided on the left shock absorber 33. The left brake caliper 712 is fixed to the end portion of the left rear telescopic element 331 of the left shock absorber 33. The left brake caliper 712 is provided at a rear portion of the end portion of the left rear telescopic element 331 of the left shock absorber 33. A brake hose 714 is connected to the left brake caliper 712. A brake fluid is fed into the left brake caliper 712 by way of the brake hose 714 so that a hydraulic pressure is provided to the left brake caliper 712. The left brake caliper 712 includes a left-right brake pad which is positioned directly on the right of the left brake disc 711 and a left-left brake pad which is positioned directly on the left of the left brake disc 711. As a result of the hydraulic pressure being applied to the left brake caliper 712, the left brake caliper 712 presses the left-right brake pad and the left-left brake pad against both surfaces of the left brake disc 711. The left brake caliper 712 holds the left disc brake 711 by the left-right brake pad and the left-left brake pad therebetween to brake the left disc brake 711 that is rotating.

A right disc brake 72 is provided on the right front wheel 32. The right disc brake 72 brakes the right front wheel 32. The right disc brake 72 includes a right brake disc 721 that is provided on the right front wheel 32 and a right brake caliper 722 that brakes the rotation of the right brake disc 721.

The right brake disc 721 preferably has a ring shape which is centered at the right wheel axle 324. The right brake disc 721 is fixed to the right front wheel 32.

The right brake caliper 722 is provided on the right shock absorber 34. The right brake caliper 722 is fixed to the end portion of the right rear telescopic element 341 of the right shock absorber 34. The right brake caliper 722 is fixed to the end portion of the right rear telescopic element 341 of the right shock absorber 34. A brake hose 724 is connected to the right brake caliper 722. A brake fluid is fed into the right brake caliper 722 by way of the brake hose 724 so that a hydraulic pressure is provided to the right brake caliper 722. The right brake caliper 722 includes a right-right brake pad which is positioned directly on the right of the right brake disc 721 and a right-left brake pad which is positioned directly on the left of the right brake disc 721. As a result of the hydraulic pressure being applied to the right brake caliper 722, the right brake caliper 722 presses the right-right brake pad and the right-left brake pad against both surfaces of the right brake disc 721. The right brake caliper 722 holds the right brake disc 721 to brake the right brake disc 721 which is rotating.

The vehicle 1 according to the present preferred embodiment includes a left wheel speed sensor 81 (an example of a wheel rotating speed detector) that measures a rotating speed of the left front wheel 31 and a right wheel speed sensor 82 (an example of a wheel rotating speed detector) that measures a rotating speed of the right front wheel 32.

As shown in FIG. 7, the left wheel speed sensor 81 includes a left sensor disc 811 (an example of a detected portion) that rotates together with the left front wheel 31 and a left detecting portion 812 (an example of a detecting portion) that is provided on the suspension device. The left sensor disc 811 preferably has a ring shape that is centered at the left wheel axle 314. The left sensor disc 811 is smaller in diameter than the left brake disc 711. The left sensor disc 811 is disposed farther inwards than an outer circumferential edge of the left brake disc 711. The left sensor disc 811 is fixed to the left front wheel 31. The left detecting portion 812 detects a rotation of the left sensor disc 811 optically or magnetically, for example. A sensor cord 813 is connected to the left detecting portion 812. A detected value of the left detecting portion 812 is transmitted through the sensor cord 813. A wheel speed of the left front wheel 31 is measured based on the detected value of the left detecting portion 812 that is transmitted via the sensor cord 813.

A sensor stay 814 is fixed to the left wheel axle supporting portion 333. The left detecting portion 812 of the left wheel speed sensor 81 is supported on the left sensor stay 814. The left sensor stay 814 has a rigidity such that the detection accuracy of the left detecting portion 812 of the left wheel speed sensor 81 is maintained sufficiently even though the left shock absorber 33 vibrates while the vehicle 1 is running.

The left detecting portion 812 of the left wheel speed sensor 81 is disposed ahead of the left wheel axle 314. The left brake caliper 712 of the left disc brake 71 is disposed ahead of the left wheel axle 314. The left wheel axle 314 is disposed between the left detecting portion 812 and the left brake caliper 712 in relation to the front-and-rear direction of the body frame 21. The left detecting portion 812 is disposed so that at least a portion thereof overlaps an axial extension of the left front telescopic element 332.

The right wheel speed sensor 82 includes a right sensor disc 821 (an example of a detected portion) that rotates together with the right front wheel 32 and a right detecting portion 822 (an example of a detecting portion) that is provided on the suspension device. The right sensor disc 821 preferably has a ring shape that is centered at the right wheel axle 324. The right sensor disc 821 is smaller in diameter than the right brake disc 721. The right sensor disc 821 is disposed farther inwards than an outer circumferential edge of the right brake disc 721. The right sensor disc 821 is fixed to the right front wheel 32. The right detecting portion 822 detects a rotation of the right sensor disc 821 optically or magnetically, for example. A sensor cord 823 is connected to the right detecting portion 822. A detected value of the right detecting portion 822 is transmitted through the sensor cord 823. A wheel speed of the right front wheel 32 is measured based on the detected value of the right detecting portion 822 that is transmitted via the sensor cord 823.

A sensor stay 824 is fixed to the right wheel axle supporting portion 343. The right detecting portion 822 of the right wheel speed sensor 82 is supported on the right sensor stay 824. The right sensor stay 824 has such a rigidity that the detection accuracy of the right detecting portion 822 of the right wheel speed sensor 82 is maintained sufficiently even though the right shock absorber 34 vibrates while the vehicle 1 is running.

The right detecting portion 822 of the right wheel speed sensor 82 is disposed ahead of the right wheel axle 324. The right brake caliper 722 of the right disc brake 72 is disposed ahead of the right wheel axle 324. The right wheel axle 324 is disposed between the right detecting portion 822 and the right brake caliper 722 in relation to the front-and-rear direction of the body frame 21. The right detecting portion 822 is disposed so that at least a portion thereof overlaps an axial extension of the right front telescopic element 342.

Figure 8:
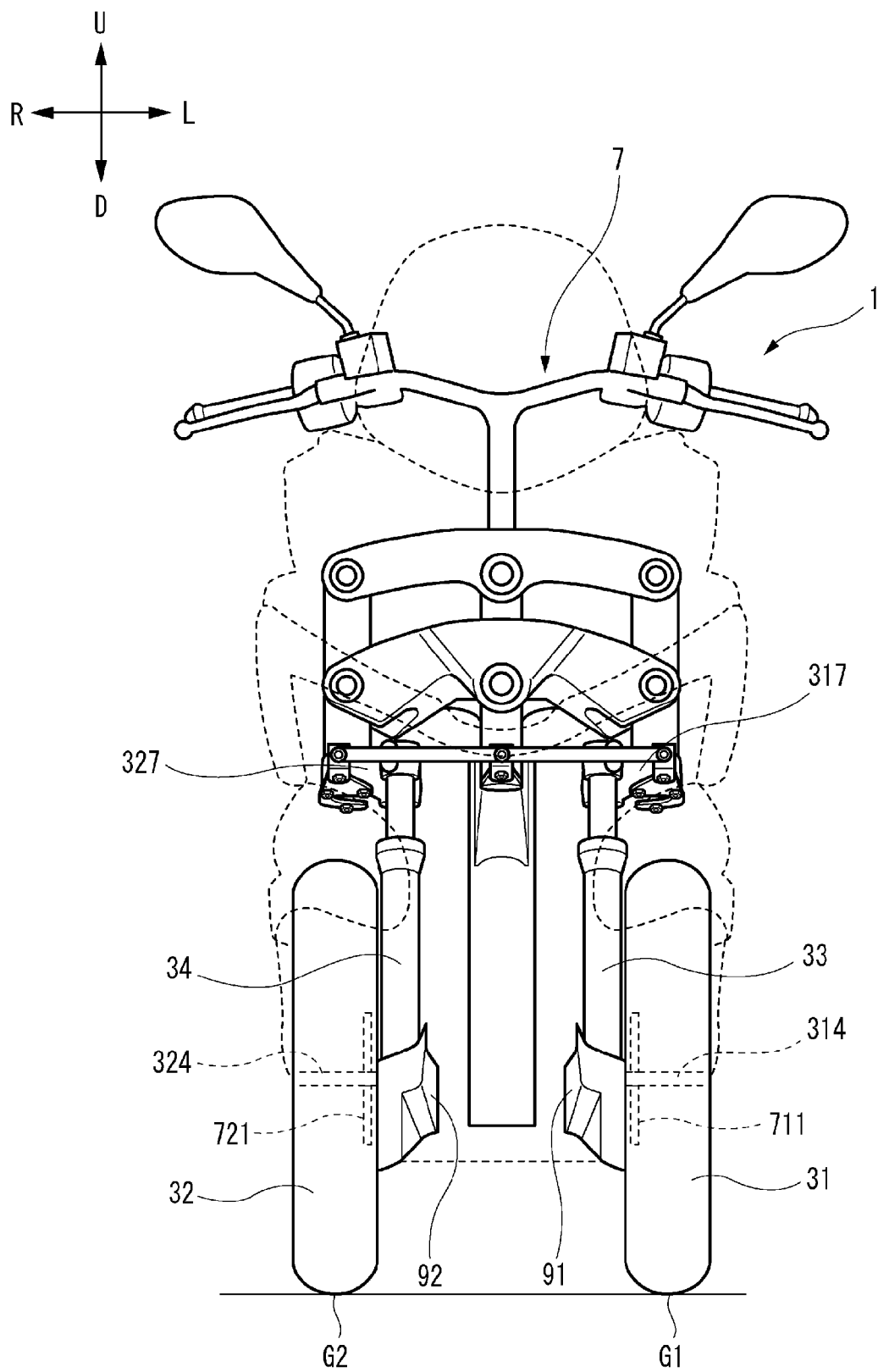
FIG. 8 is a front view of the vehicle shown in FIG. 1.

FIG. 8 is a front view of the vehicle 1 with cover members mounted thereon. As shown in FIG. 8, a left cover member 91 and a right cover member 92 are provided on the left front wheel 31 and the right front wheel 32, respectively. The left cover member 91 is provided farther rightwards of the body frame 21 than the left front wheel 31. The right cover member 92 is provided farther leftwards of the body frame 21 than the right front wheel 32.

Figure 9:
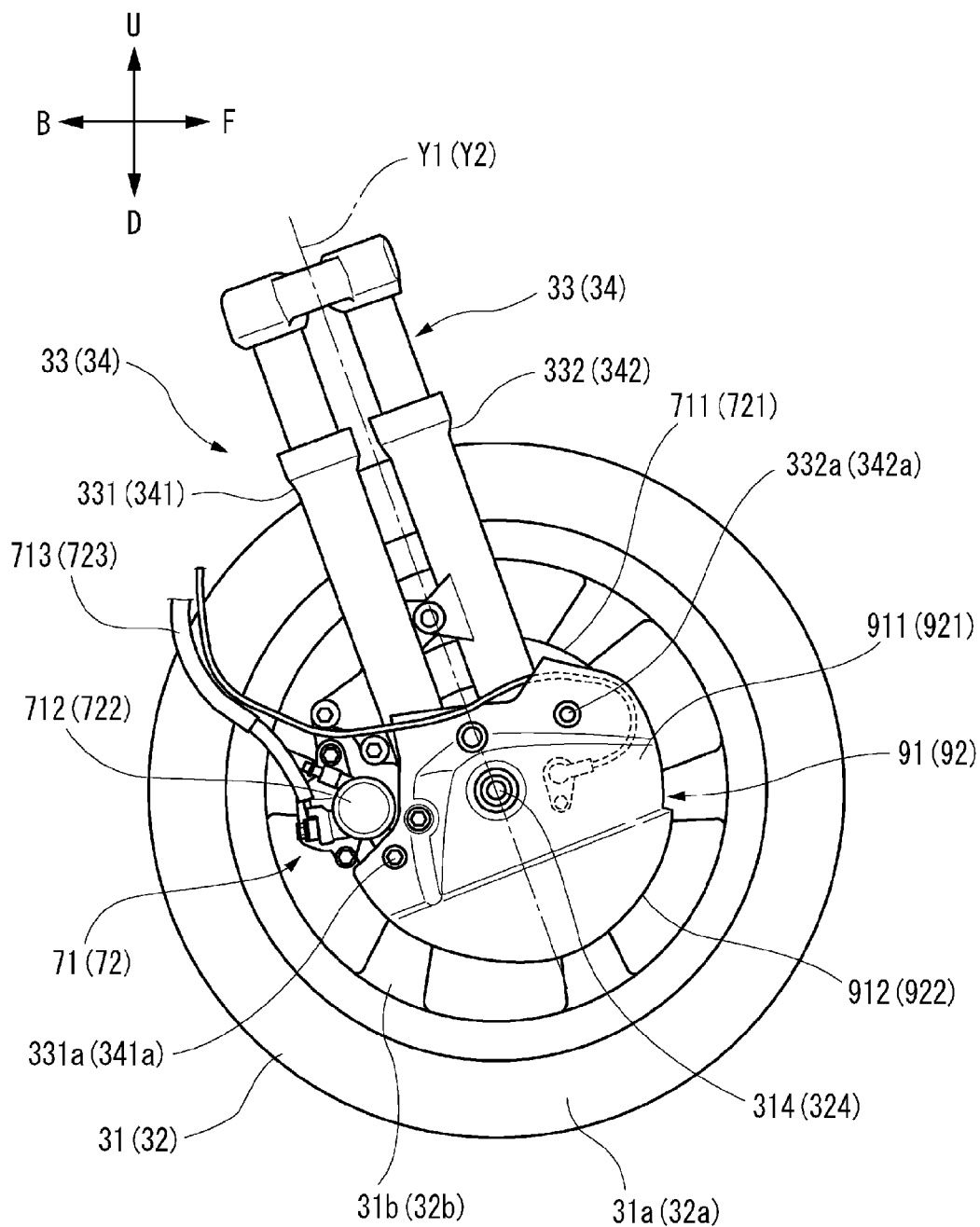
FIG. 9 is a side view of a left front wheel as viewed from a right front wheel of the vehicle shown in FIG. 1.
Figure 10:
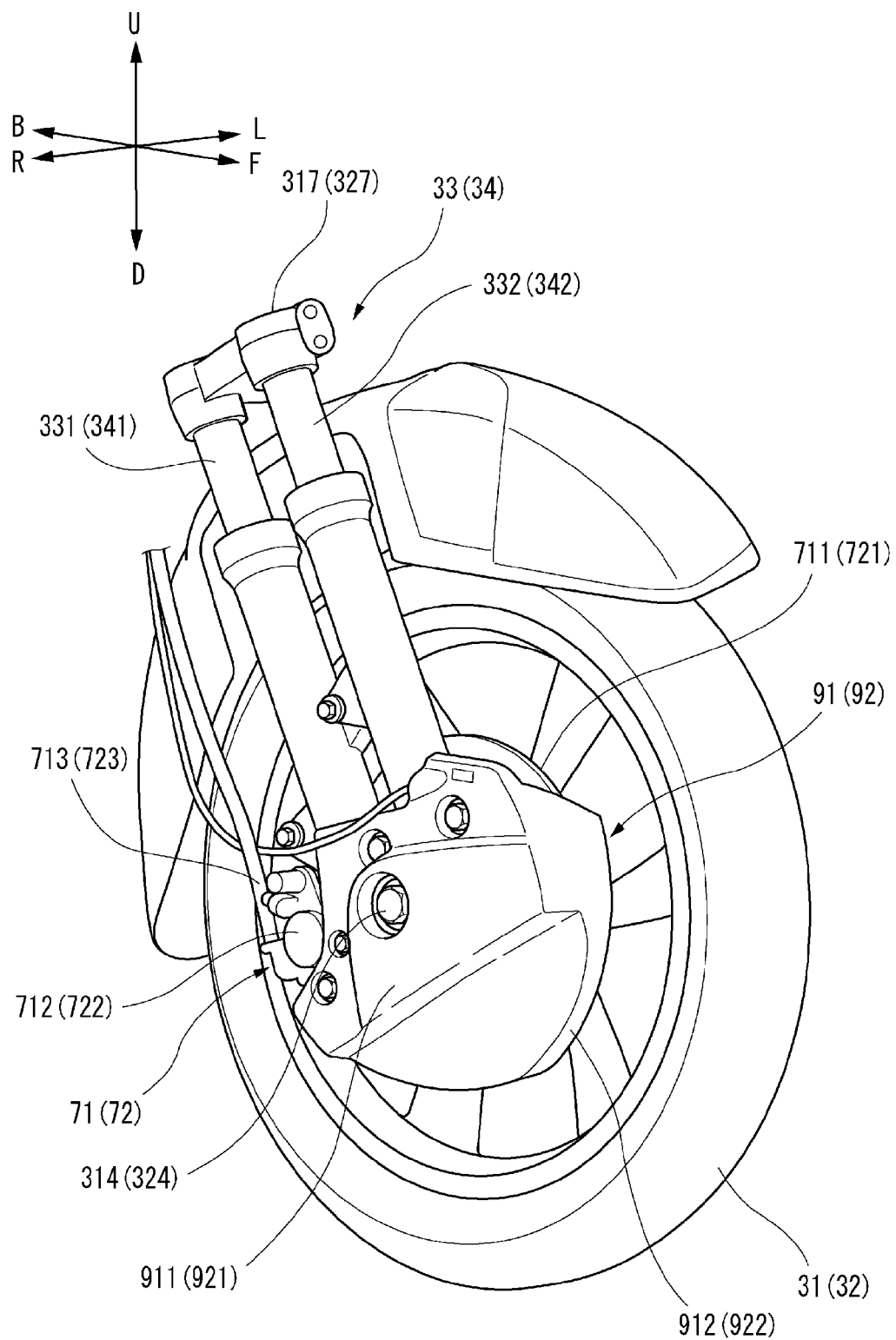
FIG. 10 is a perspective view of the left front wheel as viewed from the right front wheel of the vehicle shown in FIG. 1.
Figure 11:
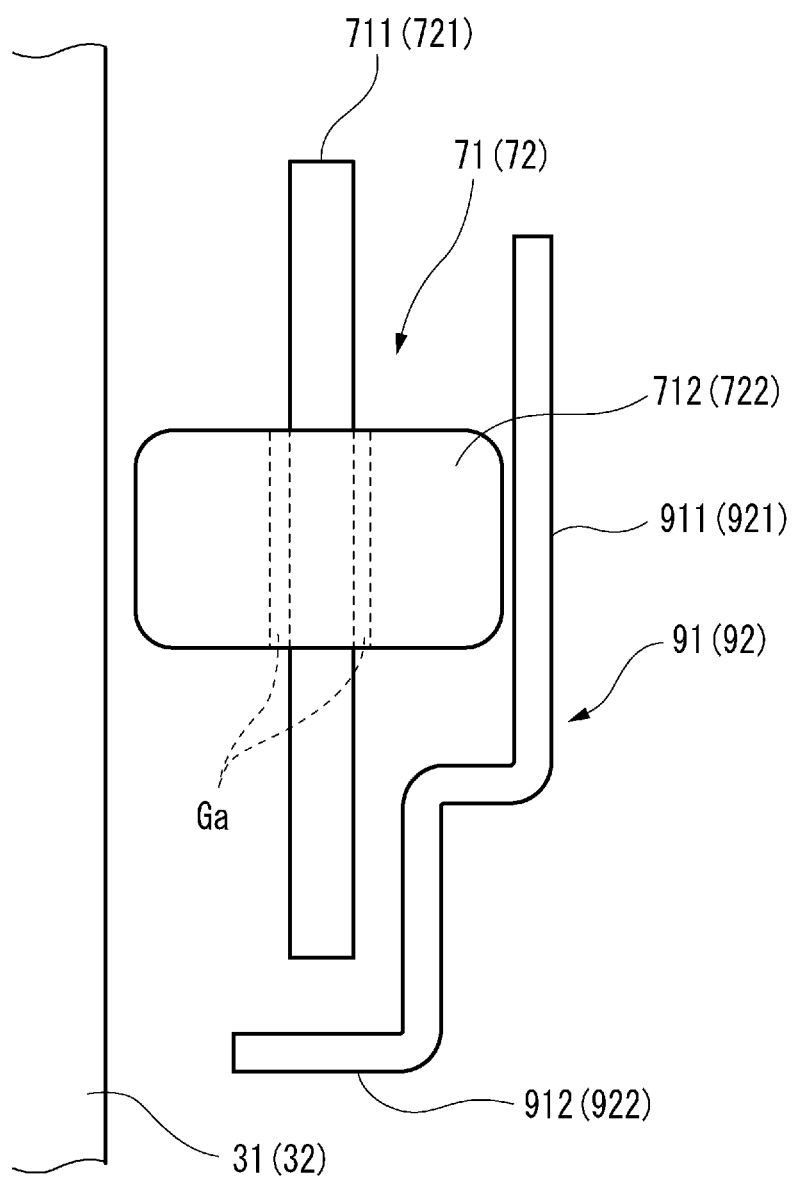
FIG. 11 is a schematic view of a left disc brake of the vehicle shown in FIG. 1 as viewed from the rear thereof.

FIG. 9 is a side view of the left front wheel 31 as viewed from the right front wheel 32 of the vehicle 1 shown in FIG. 1. FIG. 10 is a perspective view of the left front wheel 31 as viewed from the right front wheel 32 of the vehicle 1. FIG. 11 is a view of the left disc brake 71 of the vehicle 1 as viewed from the rear. In FIGS. 9 to 11, only the left front wheel 31 is shown, and reference numerals denoting the right front wheel 32 are shown, the description thereof being omitted. In this preferred embodiment, the shapes and positional relationship of the right front wheel 32 and the members that are disposed therearound are symmetrical laterally with the shapes and positional relationship of the left front wheel 31 and the members that are disposed therearound. Thus, as matter of convenience, the right front wheel 32 and the members provided therearound will be described by reference to FIGS. 9 to 11.

As shown in FIGS. 9 to 11, the left cover member 91 is provided farther rightwards of the body frame 21 than the left brake disc 711. The left cover member 91 is preferably made of a synthetic resin, for example. The left cover member 91 includes a side plate portion 911 and a circumferential plate portion 912. The circumferential plate portion 912 is provided substantially on a lower half of the side plate portion 911. The circumferential plate portion 912 projects downwards from an edge portion of the side plate portion 911. The side plate portion 911 is fixed to a cover mounting portion 331a of the left rear telescopic element 331 and a cover mounting portion 332a (refer to FIG. 7) of the left front telescopic element 332. The side plate portion 911 covers a right surface of the left brake disc 711. The left cover member 91 extends from a lower end portion of the left brake disc 711 to therebelow. The left cover member 91 extend from a front end portion of the left brake disc 711 to the front thereof. The circumferential plate portion 912 of the left cover member 91 covers below gaps Ga defined between the left brake disc 711 and the left brake caliper 712 (refer to FIG. 11). The side plate portion 911 of the left cover member 91 covers the left sensor disc 811 and the left detecting portion 812 of the left wheel speed sensor 81 when the right surface of the left brake disc 711 is viewed from a central portion in the vehicle's width direction.

The right cover member 92 is provided farther leftwards of the body frame 21 than the right brake disc 721. The right cover member 92 is preferably made of a synthetic resin, for example. The right cover member 92 includes a side plate portion 921 and a circumferential plate portion 922. The circumferential plate portion 922 is provided substantially on a lower half of the side plate portion 921. The circumferential plate portion 922 projects downwards from an edge portion of the side plate portion 921. The side plate portion 921 is fixed to a cover mounting portion 341a of the right rear telescopic element 341 and a cover mounting portion 342a (refer to FIG. 7) of the right front telescopic element 342. The side plate portion 921 covers a left surface of the right brake disc 721. The right cover member 92 extends from a lower end portion of the right brake disc 721 to therebelow. The right cover member 92 extends from a front end portion of the right brake disc 721 to the front thereof. The circumferential plate portion 922 of the right cover member 92 covers below gaps Ga defined between the right brake disc 721 and the right brake caliper 722 (refer to FIG. 11). The side plate portion 921 of the right cover member 92 covers the right sensor disc 821 and the right detecting portion 822 of the right wheel speed sensor 82 when the left surface of the right brake disc 721 is viewed from a central portion in the vehicle's width direction.

As has been described above, the suspension device includes the right cover member 92 and the left cover member 91.

As shown in FIG. 8, at least a portion of the right cover member 92 is located between the left surface of the right brake disc 721 and a ground contact point G1 of the left tire 31a and in a position located closer to the right brake disc 721 than the ground contact point G1 of the left tire 31a when the body frame 21 is in the upright state and when the body frame 21 leans to the left of the vehicle 1.

At least a portion of the left cover member 91 is located between the right surface of the left brake disc 711 and a ground contact point G2 of the right tire 32a and in a position located closer to the left brake disc 711 than the ground contact point G2 of the right tire 32a when the body frame 21 is in the upright state and when the body frame 21 leans to the right of the vehicle 1.

The inventor has studied extensively the cause for the unbalanced wear of the brake disc or the brake pad of the vehicle 1 that includes the body frame 21 that leans and the two wheels that are aligned in the left-and-right direction. The inventor has discovered from the results of the tests carried out repeatedly that the cause for the unbalanced wear is a phenomenon specific to the vehicle 1 that includes the body frame 21 that leans and the two wheels that are aligned in the left-and-right direction.

As has been described above, in general, in the vehicle 1 that includes the body frame 21 that leans and the two wheels that are aligned in the left-and-right direction, when the vehicle turns right, the body frame 21 leans to the right of the vehicle 1, whereas when the vehicle 1 turns left, the body frame 21 leans to the left of the vehicle 1. In the vehicle 1 including the body frame 21 that leans and the two wheels that are aligned in the left-and-right direction, a distance defined between the two wheels that are aligned in the left-and-right direction of the body frame 21 is much shorter than that of a general four-wheeled vehicle so as to ensure that the body frame 21 leans at a large angle.

Since the distance defined between the two wheels is very short, muddy water containing mud and sand that is thrown up by the left tire 31a of the left front wheel 31 scatters towards the right brake disc 721 or the right brake caliper 722 that is provided on the right front wheel 32. Since the distance defined between the two wheels is very short, muddy water containing mud and sand that is thrown up by the right tire 32a of the right front wheel 32 scatters towards the left brake disc 711 or the left brake caliper 712 that is provided on the left front wheel 31. Further, since the distance defined between the two wheels is very short, the muddy water containing mud and sand that is thrown up by the left front tire 31a of the left front wheel 31 and the muddy water containing mud and sand that is thrown up by the right tire 32a of the right front wheel 32 tend to stay in a space defined between the two wheels.

In case the muddy water containing mud and sand adheres to the surface of the brake disc, mud and sand intrudes between the brake disc and the brake pads. Then, the wear of the brake pads and the brake disc is promoted by the mud and sand. In case the brake devices 71, 72 operate, bringing the brake pads into contact with the brake discs 711, 721 when mud and sand adhere to the surfaces of the brake discs 711, 721, the mud and sand adhering to the brake pads are brought into contact with the brake discs 711, 721, so that the wear of the brake pads and the brake discs 711, 721 is promoted. Additionally, even though the brake devices 71, 72 do not operate, there may be a case where the mud and sand adhering to the surfaces of the brake discs 711, 721 are brought into contact with the brake pads unintentionally. This also promotes the wear.

As a result of these phenomena, a left portion of the right brake device 72 that faces the space defined between the two wheels that are disposed a very short distance therebetween is exposed to muddy water containing mud and sand that is thrown up by the left tire 31a or the left tire 31a and the right tire 32a. Additionally, a right portion of the left brake device 71 that faces the space defined between the two wheels that are disposed a very short distance therebetween is exposed to muddy water containing mud and sand that is thrown up by the right tire 32a or the right tire 32a and the left tire 31a.

On the other hand, a right portion of the right brake device 72 and a left portion of the left brake device 71 do not face the space defined between the two wheels. Because of this, the environments of the right portion and the left portion of each of the brake devices 71, 72 are different.

As a result, it has been discovered that the different environments trigger the occurrence of a phenomenon in which the wear amount differs between the right and left surfaces of the right brake disc 721, between the right-right brake pad and the right-left brake pad of the right brake caliper 722, between the right and left surfaces of the left brake disc 711, and between the left-right brake pad and the left-left brake pad of the left brake caliper 712.

Further, in the vehicle 1 including the body frame 21 that leans and the two wheels that are aligned in the left-and-right direction, the distance between the right brake device 72 and the ground contact point G1 of the left tire 31a becomes short when the body frame 21 leans to the left of the vehicle 1. Additionally, the distance between the left brake device 71 and the ground contact point G2 of the left brake device 71 and the ground contact point G2 of the right tire 32a becomes short when the body frame 21 leans to the right of the vehicle 1. It has been discovered from these facts that the above problem need to be solved by taking the changes in positional relationship into consideration.

Then, in the vehicle 1 including the body frame 21 that leans and the two wheels that are aligned in the left-and-right direction, the suspension device that supports the right front wheel 32 and the left front wheel 31 includes thereon the right cover member 92 that is located between the left surface of the right brake disc 721 and the ground contact point G1 of the left tire 31a and in the position located closer to the right brake disc 721 than the ground contact point G1 of the left tire 31a when the body frame 21 is in the upright state and when the body frame 21 leans to the left of the vehicle 1, and the left cover 91 member that is located between the right surface of the left brake disc 711 and the ground contact point G2 of the right tire 32a and in the position located closer to the left brake disc 711 than the ground contact point G2 of the right tire 32a when the body frame 21 is in the upright state and when the body frame 21 leans to the right of the vehicle 1.

In the vehicle 1 including the body frame 21 that leans and the two wheels that are aligned in the left-and-right direction, the difference in the environments between the left portion and the right portion of each brake device is reduced by the configuration of the suspension device described above. Consequently, in the vehicle 1 including the body frame 21 that leans and the two wheels that are aligned in the left-and-right direction, the unbalanced wear of the brake discs and the brake pads is significantly reduced or prevented.

Specifically, muddy water containing mud and sand that is thrown up by the left tire 31a of the left front wheel 31 scatters towards the left surface of the right brake disc 721 and the right-left brake pad. In particular, when the body frame 21 leans to the left of the vehicle 1, compared with a case where the body frame 21 is in the upright state, the distance between the ground contact point G1 of the left tire 31a and the right brake device 72 becomes short, and therefore, the left surface of the right brake disc 721 or the right-left brake pad tends to be easily splashed with the muddy water containing mud and sand. On the other hand, it is unlikely for the right surface of the right brake disc 721 and the right-right brake pad to be splashed with muddy water containing mud and sand that is thrown up by the left tire 31a.

Then, according to the vehicle 1 of the present preferred embodiment, the right cover member 92 is located between the left surface of the right brake disc 721 and the ground contact point G1 of the left tire 31a and in the position located closer to the right brake disc 721 than the ground contact point G1 of the left tire 31a. This significantly reduces or prevents the left surface of the right brake disc 721 and the right-left brake pad from being splashed with the muddy water containing mud and sand that is thrown up by the left tire 31a. This enables the right cover member 92 to reduce the degree of adhesion of mud and sand to the left surface of the right brake disc 721 and the right-left brake pad to such an extent that an unbalanced wear is unlikely to occur relative to the degree of adhesion of mud and sand to the right surface of the right brake disc 721 and the right-right brake pad which is originally small.

Additionally, muddy water containing mud and sand that is thrown up by the right tire 32a of the right front wheel 32 scatters towards the right surface of the left brake disc 711 and the left-right brake pad. In particular, when the body frame 21 leans to the right of the vehicle 1, compared with a case where the body frame 21 is in the upright state, the distance between the ground contact point G2 of the right tire 32a and the left brake device 71 becomes short, the right surface of the left brake disc 711 or the left-right brake pad tends to be easily splashed with the muddy water containing mud and sand. On the other hand, it is difficult for the left surface of the left brake disc 711 and the left-left brake pad to be splashed with muddy water containing mud and sand that is thrown up by the right tire 32a.

Then, according to the vehicle 1 of the present preferred embodiment, the left cover member 91 is located between the right surface of the left brake disc 711 and the ground contact point G2 of the right tire 32a and in the position located closer to the left brake disc 711 than the ground contact point G2 of the right tire 32a. This significantly reduces or prevents the right surface of the left brake disc 711 and the left-right brake pad from being splashed with the muddy water containing mud and sand that is thrown up by the right tire 32a. This enables the left cover member 91 to reduce the degree of adhesion of mud and sand to the right surface of the left brake disc 711 and the left-right brake pad to such an extent that an unbalanced wear is unlikely to occur relative to the degree of adhesion of mud and sand to the left surface of the left brake disc 711 and the left-left brake pad which is originally small.

Further, the muddy water containing mud and sand that is thrown up by the left tire 31a and the muddy water containing mud and sand that is thrown up by the right tire 32a tend to stay in the space defined between the two wheels, and the left surface of the right brake disc 721 and the right surface of the left brake disc 711 tend to be exposed to the muddy water containing mud and sand. On the other hand, the right surface of the right brake disc 721 and the left surface of the left brake disc 711 are not exposed to the muddy water containing mud and sand.

Then, the vehicle 1 according to the present preferred embodiment includes the right cover member 92 that is located between the left surface of the right brake disc 721 and the ground contact point G1 of the left tire 31a and in the position located closer to the right brake disc 721 than the ground contact point G1 of the left tire 31a, and the left cover member 91 that is located between the right surface of the left brake disc 711 and the ground contact point G2 of the right tire 32a and in the position located closer to the left brake disc 711 than the ground contact point G2 of the right tire 32a when the body frame 21 is in the upright state and when the body frame 21 leans to the right of the vehicle 1.

This significantly reduces or prevents the left surface of the right brake disc 721, the right surface of the left brake disc 711, the right-left brake pad, and the left-right brake pad from being splashed with the muddy water containing mud and sand that stays between the two spaces. By using this configuration, the degree of adhesion of mud and sand to the left surface of the right brake disc 721, the right surface of the left brake disc 711, the right-left brake pad, and the left-right brake pad is reduced to such an extent that an unbalanced wear is unlikely to occur relative to the degree of adhesion of mud and sand to the right surface of the right brake disc 721, the left surface of the left brake disc 711, the right-right brake pad, and the left-left brake pad which is originally small.

From these reasons, in the vehicle 1 including the body frame 21 that leans and the two wheels that are aligned in the left-and-right direction, the unbalanced wear of the brake discs and the brake pads is significantly reduced or prevented.

Thus, the inventor discovered the concept that the cover members could significantly reduce or prevent the unbalanced wear of the brake pads and the brake discs provided in the vehicle 1 including the body frame 21 that leans and the two wheels. However, the inventor did not discover the idea of installing the cover members on the vehicle 1 including the body frame 21 that leans and the two wheels from the beginning.

This is because large members such as the two wheels, the suspension device that supports the two wheels, the link mechanism 5 that causes them to lean and the like are disposed collectively at the front portion of the vehicle 1. In addition, these members move a large distance as the link mechanism 5 operates, and therefore, spaces are provided around these members to prevent the interference of these members. Because of this, even though it appears that there are spaces available at the front portion of the vehicle 1 at a glance, the spaces are originally not suitable for those members to be disposed therein. Because of this, the front portion of the vehicle 1 defines an area where no additional members are easily located. Therefore, the inventors did not have the idea of installing additional members in the space without any proper reason. Additionally, in case the distance between the two wheels that are provided in the left-and-right direction of the body frame 21 is attempted to be made shorter to ensure the required leaning amount of the body frame 21, the space at the front portion of the vehicle 1 gets narrower.

As has been described above, however, the inventors have discovered a phenomenon specific to the vehicle 1 including the body frame 21 that leans and the two wheels that occurs when the vehicle 1 including the body frame 21 that leans and the two wheels enters a puddle on the ground, that is, the phenomenon in which the inner side and the outer side of each of the pair of brake discs are splashed differently. Additionally, the inventors also discovered that this phenomenon causes an unbalanced wear of the brake pads and the brake discs, and the idea of installing the cover members to significantly reduce or prevent the unbalanced wear was conceived of by the inventors.

In addition, in the vehicle 1 according to a preferred embodiment, at least a portion of the right cover member 92 is located between the ground contact point G1 of the left tire 31a and the left surface of the right brake disc 721 that is positioned farther rearwards in the front-and-rear direction of the body frame 21 than the ground contact point G1 when the body frame 21 is in the upright state.

At least a portion of the left cover member 91 is located between the ground contact point G2 of the right tire 32a and the right surface of the left brake disc 711 that is positioned farther rearwards in the front-and-rear direction of the body frame 21 than the ground contact point G2 when the body frame 21 is in the upright state.

The left tire 31a throws up muddy water towards the rear from the ground contact point G1 thereof. It is possible to significantly reduce or prevent muddy water that is thrown up to the rear from the ground contact point G1 of the left tire 31a by the left tire 31a from splashing the left surface of the right brake disc 721 by at least a portion of the right cover member 92 that is located between the ground contact point G1 of the left tire 31a and the left surface of the right brake disc 721 that is positioned behind the ground contact point G1 of the left tire 31a.

The right tire 32a throws up muddy water towards the rear from the ground contact point G2 thereof. It is possible to significantly reduce or prevent muddy water that is thrown up to the rear from the ground contact point G2 of the right tire 32a by the right tire 32a from splashing the right surface of the left brake disc 711 by at least a portion of the left cover member 91 that is located between the ground contact point G2 of the right tire 32a and the right surface of the left brake disc 711 that is positioned behind the ground contact point G2 of the right tire 32a.

This significantly reduces or prevents the occurrence of an unbalanced wear of the brake discs 711, 721.

Further, in the vehicle 1 according to the present preferred embodiment, at least a portion of the right cover member 92 is located between the right wheel member 32b and the ground contact point G1 of the left tire 31a when the body frame 21 is in the upright state and when the body frame 21 leans to the left of the vehicle 1.

At least a portion of the left cover member 91 is located between the left wheel member 31b and the ground contact point G2 of the right tire 32a when the body frame 21 is in the upright state and when the body frame 21 leans to the right of the vehicle 1.

In the event that the right brake disc 721 is positioned on the right of the right wheel member 32b, although it is possible to prevent muddy water thrown up by the left tire 31a from splashing the right brake disc 721 and the right-left brake pad by the right wheel member 32b, this effect cannot be expected in the case of the right brake disc 721 being positioned on the left of the right wheel member 32b. According to the vehicle 1 of the present preferred embodiment, however, even in the event that the right brake disc 721 is positioned on the left of the right wheel member 32b, it is possible to significantly reduce or prevent the muddy water thrown up by the left tire 31a from splashing the right brake disc 721 by at least a portion of the right cover member 92 that is located between the right wheel member 32b and the ground contact point G1 of the left tire 31a.

In the event that the left brake disc 711 is positioned on the left of the left wheel member 31b, although it is possible to prevent muddy water thrown up by the right tire 32a from splashing the left brake disc 711 and the left-right brake pad by the left wheel member 31b, this effect cannot be expected in the case of the left brake disc 711 being positioned on the right of the left wheel member 31b. According to the vehicle 1 of the present preferred embodiment, however, even in the event that the left brake disc 711 is positioned on the right of the left wheel member 31b, it is possible to significantly reduce or prevent the muddy water thrown up by the right tire 32a from splashing the left brake disc 711 by at least a portion of the left cover member 91 that is located between the left wheel member 31b and the ground contact point G2 of the right tire 32a.

This significantly reduces or prevents the occurrence of an unbalanced wear of the brake discs 711, 721.

Further, in the vehicle 1 according to the present preferred embodiment, the right cover member 92 is located between a portion of the right detected portion 821 which rotates together with the right front wheel 32 or the right detecting portion 822 and the ground contact point G1 of the left tire 31a and in the position located closer to the portion of the right detected portion 821 that rotates together with the right front wheel 32 or the right detecting portion 822 than the ground contact point G1 of the left tire 31a. Furthermore, the left cover member 91 is located between a portion of the left detected portion 811 which rotates together with the left front wheel 31 or the left detecting portion 812 and the ground contact point G2 of the right tire 32a and in the position located closer to the portion of the left detected portion 811 that rotates together with the left front wheel 31 or the left detecting portion 812 than the ground contact point G2 of the right tire 32a.

The right cover member 92 and the left cover member 91 prevent an unbalanced wear of the brake discs 711, 721 and the brake pads and also significantly reduce or prevent the muddy water from splashing the wheel rotating speed detectors 81, 82.

In this preferred embodiment, while the vehicle 1 is described as preferably including both the left wheel rotating speed detector 81 and the right wheel rotating speed detector 82, the vehicle 1 may be a vehicle that includes either of the left wheel rotating speed detector 81 and the right wheel rotating speed detector 82.

In the vehicle 1 according to this preferred embodiment, the suspension device preferably includes the right telescopic element which supports the right front wheel 32 so as to be displaced linearly and the left telescopic element which supports the left wheel 31 so as to be displaced linearly.

The right front wheel 32, the right brake caliper 722, and the right cover member 92 are supported at the lower portion of the right telescopic element.

The left front wheel 31, the left brake caliper 712, and the left cover member 91 are supported at the lower portion of the left telescopic element.

According to the vehicle 1 of the present preferred embodiment, the right front wheel 32, the right brake caliper 722, and the right cover member 92 are supported at the lower portion of the right telescopic element. Because of this, even in case the right front wheel 32 is displaced linearly by the right telescopic element, the right cover member 92 is displaced in the same manner as the right brake disc 721 and the right brake caliper 722 that are provided on the right front wheel 32, and therefore, the right cover member 92 has a high following capability. This enables the right cover member 92 that is small in size to significantly reduce or prevent the adhesion of muddy water to the right brake disc 721 and the right-left brake pad efficiently.

According to the vehicle 1 of the present preferred embodiment, the left front wheel 31, the left brake caliper 712, and the left cover member 91 are preferably supported at the lower portion of the left telescopic element. Because of this, even in case the left front wheel 31 is displaced linearly by the left telescopic element, the left cover member 92 is displaced in the same manner as the left brake disc 711 and the left brake caliper 712 that are provided on the left front wheel 31, and therefore, a high following capability is provided. This enables the left cover member 91 that is small in size to significantly reduce or prevent the adhesion of muddy water to the left brake disc 711 and the left-right brake pad efficiently.

Further, in the vehicle 1 according to the present preferred embodiment, the suspension device preferably includes the right front telescopic element 342 and the right rear telescopic element 341 that supports the right front wheel 32 so as to be displaced linearly and that are aligned in the front-and-rear direction of the body frame 21 and the left front telescopic element 332 and the left rear telescopic element 331 that supports the left front wheel 31 so as to be displaced linearly and that are aligned in the front-and-rear direction of the body frame 21.

An exposed area of the right brake disc 721 as viewed from the ground contact point G1 of the left tire 31a is easily reduced by the right front telescopic element 342 and the right rear telescopic element 341. By using this configuration, it is easy to significantly reduce or prevent muddy water thrown up by the left tire 31a from splashing the right brake disc 721.

An exposed area of the left brake disc 711 as viewed from the ground contact point G2 of the right tire 32a is easily reduced by the left front telescopic element 332 and the left rear telescopic element 331. By using this configuration, it is easy to significantly reduce or prevent muddy water thrown up by the right tire 32a from splashing the left brake disc 711.

Further, in the vehicle 1 according to the present preferred embodiment, the right front wheel 32 is a right front wheel, and the left front wheel 31 is a left front wheel.

It is preferable that the front wheels 3 have a larger braking capacity than that of the rear wheel 4. Because of this, large brake discs are provided on the front wheels 3 on many occasions. The brake discs 711, 721 having a large surface area tend to be exposed to muddy water, and therefore, the probability that an unbalanced wear occurs thereon tends to be increased. According to the vehicle 1 of the present preferred embodiment, the right cover member 92 and the left cover member 91 significantly reduces or prevents the unbalanced wear of the brake discs 711, 721.

Further, in the vehicle 1 according to the present preferred embodiment, the suspension device preferably includes the right shock absorber 34 that supports the right front wheel 32 at the lower portion thereof and that absorbs the upward displacement of the right front wheel 32 in the up-and-down direction of the body frame 21, the left shock absorber 33 that supports the left front wheel 31 at the lower portion thereof and that absorbs the upward displacement of the left front wheel 31 in the up-and-down direction of the body frame 21, and the link mechanism 5.

The link mechanism 5 includes the right side member 54 that supports the upper portion of the right shock absorber 34 so as to turn about the right steering axis Y2 that extends in the up-and-down direction of the body frame 21, the left side member 53 that supports the upper portion of the left shock absorber 33 so as to turn about the left steering axis Y1 that is parallel to the right steering axis Y2, the upper cross member 51 that supports the upper portion of the right side member 54 at the right end portion thereof so as to turn about the upper right axis E that extends in the front-and-rear direction of the body frame 21 and supports the upper portion of the left side member 53 at the left end portion thereof so as to turn about the upper left axis D that is parallel to the upper right axis E and that is supported on the body frame 21 at the middle portion thereof so as to turn about the upper middle axis C that is parallel to the upper right axis E and the upper left axis D, and the lower cross member 52 that supports the lower portion of the right side member 54 at the right end portion thereof so as to turn about the lower right axis H that is parallel to the upper right axis E and supports the lower portion of the left side member 53 at the left end portion thereof so as to turn about the lower left axis G that is parallel to the upper left axis D and that is supported on the body frame 21 at the middle portion thereof so as to turn about the lower middle axis F that is parallel to the upper middle axis C.

In the event that the so-called parallelogram link mechanism 5 is installed in the vehicle, the link mechanism 5 is positioned above the right front wheel 32 and the left front wheel 31 to reduce the left-and-right distance between the two wheels, thus making it possible to make the vehicle compact in relation to a width thereof. However, in the event that the distance between the two wheels is short, as has been described above, it becomes easy for muddy water containing mud and sand that is thrown up by the two wheels to adhere to the right brake device 72 and the left brake device 71, promoting the occurrence of an unbalanced wear of the brake discs 711, 721 and the brake pads. Then, providing the cover members 91, 92 of the preferred embodiments significantly reduces or prevents the occurrence of such an unbalanced wear.

The preferred embodiments that have been described above are intended to facilitate the understanding of the present invention and are not intended to limit the present invention. The preferred embodiments of the present invention can be modified or improved without departing from the spirit and scope thereof and that their equivalents can also be included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

For example, in the preferred embodiments described above, while the vehicle 1 is described in which the front wheels 3 preferably include the left front wheel 31 and the right front wheel 32 and include the left cover member 91 configured to protect the left disc brake 71 which brakes the left front wheel 31 and the right cover member 92 configured to protect the right disc brake 72 which brakes the right front wheel 32, the present invention is not limited thereto. For example, a vehicle may be provided in which rear wheels 4 include a left rear wheel and a right rear wheel and include a left cover member configured to protect a left disc brake which brakes the left rear wheel and a right cover member configured to protect a right disc brake which brakes a right rear wheel.

Alternatively, in the preferred embodiments described above, while the configuration is described in which the left brake disc 711 is preferably provided on the right of the left front wheel 31 and the right brake disc 721 is preferably provided on the left of the right front wheel 32, the present invention is not limited thereto. A configuration may be used in which the left brake disc 711 is provided on the left of the left front wheel 31 and the right brake disc 721 is provided on the right of the right front wheel 32. Additionally, a configuration may be used in which the left brake disc is provided on the left of the left rear wheel and the right brake disc is provided on the right of the right rear wheel.

In the preferred embodiments described above, the configuration is described in which the parallelogram type link mechanism 5 is preferably used, and no other members are disposed between the right front wheel 32 and the left front wheel 31. In this configuration, there is no member that blocks muddy water scattered from the wheels 3 to the brake devices 71, 72 installed on the corresponding wheels, and the brake devices 71, 72 are easily splashed with the muddy water containing mud and sand. Thus, the preferred embodiments of the present invention are particularly effective. However, even in the event that a member is disposed between the right front wheel 32 and the left front wheel 31 as when a double wishbone type link mechanism 5 is used, needless to say, it is possible to significantly reduce prevent muddy water containing mud and sand from being scattered from the wheels 3 towards the brake devices 71, 72 of the corresponding wheels with the cover members 91, 92 of the preferred embodiments of the present invention.

In the preferred embodiments described above, the left disc brake 71 and the left wheel speed sensor 81 are preferably provided directly on the right of the left front wheel 31, and those are covered by the left cover member 91. Similarly, the right disc brake 72 and the right wheel speed sensor 82 are preferably provided directly on the left of the right front wheel 32, and those are covered by the right cover member 92. However, the arrangement of the left disc brake 71, the left wheel speed sensor 81, the left cover member 91, the right disc brake 72, the right wheel speed sensor 82, and the right cover member 92 is not limited to the preferred embodiments described above. For example, the left disc brake 71 and the left wheel speed sensor 81 may be provided directly on the left of the left front wheel 31, and those may be covered by the left cover member 91. Similarly, the right disc brake 72 and the right speed sensor 82 may be provided directly on the right of the right front wheel 32, and those may be covered by the right cover member 92.

In addition, in the preferred embodiments described above, the vehicle 1 is described in which the left wheel rotating speed detector 81 preferably detects the rotating speed of the left front wheel 31, while the right wheel rotating speed detector 82 preferably detects the rotating speed of the right front wheel 32. However, the present invention is not limited to this configuration. The vehicle may be configured so that the left wheel rotating speed detector detects the rotating speed of the left rear wheel, while the right wheel rotating speed detector detects the rotating speed of the right rear wheel.

In the preferred embodiments described above, while the vehicle 1 is described as including both the left wheel rotating speed detector 81 and the right wheel rotating speed detector 82, the vehicle 1 may be a vehicle that includes either of the left wheel rotating speed detector 81 and the right wheel rotating speed detector 82.

In the preferred embodiments of the present invention, the acute angles are angles that include 0° and that are smaller than 90°. Originally, the acute angles do not include 0°, but in the preferred embodiments of the present invention, it is understood that the acute angles include 0°. In the preferred embodiments of the present invention, the imaginary plane that intersects perpendicularly the upper axes and the lower axes of the cross members is a plane that extends rearwards and upwards. However, the present invention is not limited thereto, and hence, the imaginary plane that intersects perpendicularly the upper axes and the lower axes of the cross members may be a plane that extends forwards and upwards.

When referred to in this description, "parallel" also includes two straight lines that do not intersect each other as members while they are inclined within the range of ±40°. When used together with a "direction" and a "member" in the invention, "along" also includes a case where what follows the direction and the member is inclined relative thereto within the range of ±40°. When used together with a "direction" in the invention, "extend" also includes a case where what extends is inclined relative to the direction within the range of ±40°.

The vehicle 1 according to the preferred embodiments described above is preferably a vehicle 1 including a body frame that leans and two wheels that are aligned in a left-and-right direction. The vehicle 1 may be a vehicle that includes two front wheels and one or more rear wheels or a vehicle that includes two rear wheels and one or more front wheels. The vehicle may include a body cover that covers the body frame. The vehicle may not include the body cover which covers the body frame. The power unit includes the power source. The power source is not limited to the engine and hence may be an electric motor.

In the preferred embodiments of the present invention described above, the center in the left-and-right direction of the body frame 21 of the rear wheel 4 preferably coincides with the center in the left-and-right direction of the body frame 21 of the distance defined between the left front wheel 31 and the right front wheel 32. Although the configuration described above is preferable, the center in the left-and-right direction of the body frame 21 of the rear wheel 4 does not have to coincide with the center in the left-and-right direction of the body frame 21 of the distance defined between the left front wheel 31 and the right front wheel 32.

In the preferred embodiments described above, the right side portion 54, the left side portion 53, and the headstock 211 are provided in positions that are preferably superposed one on another when the body frame 21 is viewed from the sides thereof. However, when the body frame 21 is viewed from the side thereof, the headstock 211 may be provided in a different position from the positions where the right side portion 53 and the left side portion 54 are provided in relation to the front-and-rear direction. Additionally, angles at which the right side portion 54 and the left side portion 53 lean from the up-and-down direction of the body frame 21 may differ from an angle at which the headstock 211 leans.

The headstock that supports the link mechanism may include a single structural element or a plurality of structural elements. In the case of the headstock including a plurality of structural elements, the structural elements may be joined together through welding, bonding or the like. Alternatively, the structural elements may be joined together with fastening members such as bolts, rivets or the like.

In the preferred embodiments described above, while the headstock 211 is described as preferably being a portion of the body frame 21 that supports the steering shaft 60 so as to turn, the present invention is not limited thereto. A member can be used which supports the steering shaft 60 so as to turn about a middle steering axis Y3 in place of the headstock. For example, a member may be used which includes a bearing which supports the steering shaft 60 so as to turn about the middle steering axis Y3.

In the preferred embodiments described above, the body frame preferably includes the link support portion that supports the link such as the headstock, the connecting member (the upper front and rear frame portions), the down frame (the upper and lower frame portions) and the under frame (the lower front and rear frame portions), and these constituent elements are connected together through welding. However, the body frame of the present invention is not limited to the preferred embodiments described above. The body frame preferably includes the link support portion, the upper front and rear frame portions, the upper and lower frame portions and the lower front and rear frame portions. For example, the body frame may be integral wholly or partially through casting. Additionally, in the body frame, the upper front and rear frame portions and the upper and lower frame portions may include a single member or a plurality of separate members.

In the preferred embodiments described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In the preferred embodiments described above, an acute angle defined by the turning axis of the steering shaft and the up-and-down direction of the body frame preferably coincides with an acute angle defined by the direction in which the right shock absorber and the left shock absorber extend or contract and the up-and-down direction of the body frame. However, the present invention is not limited to the preferred embodiments described above. For example, the acute angle defined by the middle steering axis Y3 of the steering shaft and the up-and-down direction of the body frame may be smaller or larger than the acute angle defined by the direction in which the right shock absorber and the left shock absorber extend or contract and the up-and-down direction of the body frame.

In addition, in the preferred embodiments described above, the middle steering axis Y3 of the steering shaft and the direction in which the right shock absorber and the left shock absorber extend or contact preferably coincide with each other. However, the present invention is not limited to the preferred embodiments described above. In a side view of the vehicle being in the upright state, the turning axis of the steering shaft and the direction in which the right shock absorber and the left shock absorber extend or contact may be spaced apart from each other in the front-and-rear direction. Additionally, for example, the turning axis of the steering shaft and the direction in which the right shock absorber and the left shock absorber extend or contact may intersect each other.

Further, in the preferred embodiments described above, the direction in which the right shock absorber extends and contracts preferably coincides with right steering axis Y2 of the right shock absorber, and the direction in which the right shock absorber extends and contracts preferably coincides with the left steering axis Y1 of the left shock absorber. However, the present invention is not limited to the preferred embodiments described above. The direction in which the right shock absorber extends and contracts may not coincide with the right steering axis Y2 of the right shock absorber, and the direction in which the right shock absorber extends and contracts may not coincide with the left steering axis Y1 of the left shock absorber.

In the preferred embodiments described above, the right front wheel and the left front wheel are preferably supported so that their upper ends move farther upwards in the up-and-down direction of the body frame than an upper end of the down frame of the body frame. However, the present invention is not limited to the preferred embodiments described above. In the present invention, the right front wheel and the left front wheel may be able to move upwards as high as or to a height that is lower than the upper end of the down frame of the body frame in the up-and-down direction of the body frame.

The upper cross portion may include an upper front cross portion that includes a single structural element, an upper rear cross portion that includes a single structural element, and a connecting member that is located between the upper and lower cross portions and that includes a plurality of structural elements. In the case of the headstock including a plurality of structural elements, the structural elements may be joined together through welding, bonding or the like. Alternatively, the structural elements may be joined together with fastening members such as bolts, rivets or the like.

The lower cross portion may include a lower front cross portion includes a single structural element, a lower rear cross portion that includes a single structural element, and a connecting member that is located between the lower front and rear cross portions and that includes a plurality of structural elements. In the case of the headstock including a plurality of structural elements, the structural elements may be joined together through welding, bonding or the like. Alternatively, the structural elements may be joined together with fastening members such as bolts, rivets or the like.

The right side portion and the left side portion may each include a single structural element or a plurality of structural elements. In the case of the headstock including a plurality of structural elements, the structural elements may be joined together through welding, bonding or the like. Alternatively, the structural elements may be joined together with fastening members such as bolts, rivets or the like. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In the preferred embodiments of the present invention, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that lies above a cross portion that lies therebelow. The lower cross portion does not imply a lowermost cross portion in the link mechanism. The lower cross portion means a cross portion that lies below a cross portion that lies thereabove. Additionally, the cross portion may include two structural elements of a right cross portion and a left cross portion. In this manner, the upper cross portion and the lower cross portion may each include a plurality of cross portions as long as they still exhibit the link function. Further, other cross portions may be provided between the upper cross portion and the lower cross portion. The link mechanism should preferably include the upper cross portion and the lower cross portion.

The present invention can be embodied in many different forms. This disclosure should be understood to provide preferred embodiments of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments described herein. The present invention also includes every preferred embodiment that includes equivalent elements, modifications, deletions, combinations (for example, a combination of characteristics of various preferred embodiments), improvements and/or alternations that those skilled in the art to which the invention pertains can recognize based on the disclosure herein. The limitative matters of claims should be construed broadly based on terms used in the claims and hence should not be limited by the preferred embodiments described in this description or the prosecution of this patent application. The preferred embodiments should be construed to be non-exclusive. For example, in this disclosure, such terms as "preferable" and "good" are non-exclusive terms and mean that "it is preferable but does not limit the invention thereto" and "it is good but does not limit the invention thereto," respectively.

The contents of the Japanese Patent Application No. 2013-138477 filed on Jul. 1, 2013 are incorporated by reference in their entirety, and constitute a part of the description of this patent application. Namely, configurations which will be itemized below also constitute a part of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame that leans to the right of the vehicle when the vehicle turns right and leans to the left of the vehicle when the vehicle turns left;
   a right wheel and a left wheel that are spaced apart in a left-and-right direction of the body frame;
   a suspension device that supports the right wheel and the left wheel on the body frame;
   a right brake device that includes a right brake disc provided on the right wheel and a right brake caliper that brakes rotation of the right brake disc; and
   a left brake device that includes a left brake disc provided on the left wheel and a left brake caliper that brakes rotation of the left brake disc; wherein
   the right wheel includes a right tire and a right wheel member that supports the right tire and rotates together with the right brake disc;
   the left wheel includes a left tire and a left wheel member that supports the left tire and rotates together with the left brake disc;
   the right brake caliper includes a right-right brake pad that is positioned to the right of the right brake disc and a right-left brake pad that is positioned to the left of the right brake disc;
   the left brake caliper includes a left-right brake pad that is positioned to the right of the left brake disc and a left-left brake pad that is positioned to the left of the left brake disc;
   the suspension device includes:
      a right cover member made of a synthetic resin and that is provided at least partially between a left surface of the right brake disc and a ground contact point of the left tire and in a position located closer to the right brake disc than the ground contact point of the left tire when the body frame is in an upright state and when the body frame leans to the left of the vehicle, the right cover member including a circumferential plate portion that extends radially from a lowermost portion of the right cover member and underneath the right brake disc; and
      a left cover member made of a synthetic resin and that is provided at least partially between a right surface of the left brake disc and a ground contact point of the right tire and in a position located closer to the left brake disc than the ground contact point of the right tire when the body frame is in the upright state and when the body frame leans to the right of the vehicle, the left cover member including a circumferential plate portion that extends radially from a lowermost portion of the left cover member and underneath the left brake disc.

2. The vehicle according to claim 1, wherein at least a portion of the right cover member is located between the ground contact point of the left tire and the left surface of the right brake disc that is positioned behind the ground contact point of the left tire in relation to a front-and-rear direction of the body frame when the body frame is in the upright state, and at least a portion of the left cover member is located between the ground contact point of the right tire and the right surface of the left brake disc that is positioned behind the ground contact point of the right tire in relation to the front-and-rear direction of the body frame when the body frame is in the upright state.

3. The vehicle according to claim 1, wherein
   at least a portion of the right cover member is located between the right wheel and the ground contact point of the left tire when the body frame is in the upright state and when the body frame leans to the left of the vehicle; and
   at least a portion of the left cover member is located between the left wheel and the ground contact point of the right tire when the body frame is in the upright state and when the body frame leans to the right of the vehicle.

4. The vehicle according to claim 1, further comprising a wheel rotating speed detector including a detected portion that rotates together with at least one of the right wheel and the left wheel and a detecting portion that is provided on the suspension device and that measures a rotating speed of the at least the one of the right wheel and the left wheel; wherein
   at least a portion of the right cover member and/or the left cover member is located between a portion of the detected portion that rotates together with the right wheel or the detecting portion and the ground contact point of the left tire and in a position that is located closer to the portion of the detected portion that rotates together with the right wheel or the detecting portion than the ground contact point of the left tire when the body frame is in the upright state and when the body frame leans to the left of the vehicle and/or is located between a portion of the detected portion that rotates together with the left wheel or the detecting portion and the ground contact point of the right tire and in a position that is located closer to the portion of the detected portion that rotates together with the left wheel or the detecting portion than the ground contact point of the right tire when the body frame is in the upright state and when the body frame leans to the right of the vehicle.

5. The vehicle according to claim 1, wherein
   the suspension device includes a right telescopic element that supports the right wheel so that the right wheel is displaced linearly and a left telescopic element that supports the left wheel so that the left wheel is displaced linearly;
   the right wheel, the right brake caliper, and the right cover member are supported at a lower portion of the right telescopic element; and
   the left wheel, the left brake caliper, and the left cover member are supported at a lower portion of the left telescopic element.

6. The vehicle according to claim 1, wherein the suspension device includes a right front telescopic element and a right rear telescopic element that support the right wheel so that the right wheel is displaced linearly and that are disposed so as to be aligned in the front-and-rear direction of the body frame, and a left front telescopic element and a left rear telescopic element that support the left wheel so that the left wheel is displaced linearly and that are disposed so as to be aligned in the front-and-rear direction of the body frame.

7. The vehicle according to claim 1, wherein the right wheel is a right front wheel and the left wheel is a left front wheel.

8. The vehicle according to claim 1, wherein the suspension device includes:
   a right shock absorbing device which supports the right wheel at a lower portion thereof and absorbs an upward displacement of the right wheel in an up-and-down direction of the body frame;
   a left shock absorbing device which supports the left wheel at a lower portion thereof and absorbs an upward displacement of the left wheel in the up-and-down direction of the body frame; and
   a link mechanism; wherein
   the link mechanism includes:
   a right side portion that supports an upper portion of the right shock absorbing device so as to rotate about a right steering axis that extends in the up-and-down direction of the body frame;
   a left side portion that supports an upper portion of the left shock absorbing device so as to rotate about a left steering axis that is parallel or substantially parallel to the right steering axis;
   an upper cross portion that supports, at a right end portion thereof, an upper portion of the right side portion so as to rotate about an upper right axis that extends in the front-and-rear direction of the body frame and supports, at a left end portion thereof, an upper portion of the left side portion so as to turn about an upper left axis that is parallel or substantially parallel to the upper right axis and that is supported at a middle portion thereof on the body frame so as to turn about an upper middle axis that is parallel or substantially parallel to the upper right axis and the upper left axis; and
   a lower cross portion that supports, at a right end portion thereof, a lower portion of the right side portion so as to turn about a lower right axis that is parallel or substantially parallel to the upper right axis and supports, at a left end portion thereof, a lower portion of the left side portion so as to turn about a lower left axis that is parallel or substantially parallel to the upper left axis and that is supported at a middle portion thereof on the body frame so as to turn about a lower middle axis that is parallel or substantially parallel to the upper middle axis.

9. The vehicle according to claim 1, wherein
   the right cover member is located at least partially between a lowermost portion of the right brake disc and the ground contact point of the left tire when the body frame is in an upright state; and
   the left cover member is located at least partially between a lowermost portion of the left brake disc and a ground contact point of the right tire when the body frame is in the upright state.

10. The vehicle according to claim 1, wherein
    the right cover member is located at least partially between a lowermost portion of the right brake disc and the ground contact point of the left tire when the body frame leans to the left of the vehicle; and
    the left cover member is located at least partially between a lowermost portion of the left brake disc and a ground contact point of the right tire when the body frame leans to the right of the vehicle.

11. A vehicle comprising:
    a body frame that leans to the right of the vehicle when the vehicle turns right and leans to the left of the vehicle when the vehicle turns left;
    a right wheel and a left wheel that are spaced apart in a left-and-right direction of the body frame;
    a suspension device that supports the right wheel and the left wheel on the body frame;
    a right brake device that includes a right brake disc provided on the right wheel and a right brake caliper that brakes rotation of the right brake disc; and
    a left brake device that includes a left brake disc provided on the left wheel and a left brake caliper that brakes rotation of the left brake disc; wherein
    the right wheel includes a right tire and a right wheel member that supports the right tire and rotates together with the right brake disc;
    the left wheel includes a left tire and a left wheel member that supports the left tire and rotates together with the left brake disc;

the right brake caliper includes a right-right brake pad that is positioned to the right of the right brake disc and a right-left brake pad that is positioned to the left of the right brake disc;

the left brake caliper includes a left-right brake pad that is positioned to the right of the left brake disc and a left-left brake pad that is positioned to the left of the left brake disc;

the suspension device includes:
- a right cover member made of a synthetic resin and that is provided at least partially between a left surface of the right brake disc and a ground contact point of the left tire and in a position located closer to the right brake disc than the ground contact point of the left tire when the body frame is in an upright state and when the body frame leans to the left of the vehicle, the right cover member including a circumferential plate portion that extends radially from a lowermost portion of the right cover member and underneath a gap between the left surface of the right brake disc and the right-left brake pad of the right brake caliper; and
- a left cover member made of a synthetic resin and that is provided at least partially between a right surface of the left brake disc and a ground contact point of the right tire and in a position located closer to the left brake disc than the ground contact point of the right tire when the body frame is in the upright state and when the body frame leans to the right of the vehicle, the left cover member including a circumferential plate portion that extends radially from a lowermost portion of the left cover member and underneath a gap between the right surface of the left brake disc and the left-right brake pad of the left brake caliper.

12. The vehicle according to claim 11, wherein at least a portion of the right cover member is located between the ground contact point of the left tire and the left surface of the right brake disc that is positioned behind the ground contact point of the left tire in relation to a front-and-rear direction of the body frame when the body frame is in the upright state, and at least a portion of the left cover member is located between the ground contact point of the right tire and the right surface of the left brake disc that is positioned behind the ground contact point of the right tire in relation to the front-and-rear direction of the body frame when the body frame is in the upright state.

13. The vehicle according to claim 11, wherein
at least a portion of the right cover member is located between the right wheel and the ground contact point of the left tire when the body frame is in the upright state and when the body frame leans to the left of the vehicle; and
at least a portion of the left cover member is located between the left wheel and the ground contact point of the right tire when the body frame is in the upright state and when the body frame leans to the right of the vehicle.

14. The vehicle according to claim 11, further comprising a wheel rotating speed detector including a detected portion that rotates together with at least one of the right wheel and the left wheel and a detecting portion that is provided on the suspension device and that measures a rotating speed of the at least the one of the right wheel and the left wheel; wherein
at least a portion of the right cover member and/or the left cover member is located between a portion of the detected portion that rotates together with the right wheel or the detecting portion and the ground contact point of the left tire and in a position that is located closer to the portion of the detected portion that rotates together with the right wheel or the detecting portion than the ground contact point of the left tire when the body frame is in the upright state and when the body frame leans to the left of the vehicle and/or is located between a portion of the detected portion that rotates together with the left wheel or the detecting portion and the ground contact point of the right tire and in a position that is located closer to the portion of the detected portion that rotates together with the left wheel or the detecting portion than the ground contact point of the right tire when the body frame is in the upright state and when the body frame leans to the right of the vehicle.

15. The vehicle according to claim 11, wherein
the suspension device includes a right telescopic element that supports the right wheel so that the right wheel is displaced linearly and a left telescopic element that supports the left wheel so that the left wheel is displaced linearly;
the right wheel, the right brake caliper, and the right cover member are supported at a lower portion of the right telescopic element; and
the left wheel, the left brake caliper, and the left cover member are supported at a lower portion of the left telescopic element.

16. The vehicle according to claim 11, wherein the suspension device includes a right front telescopic element and a right rear telescopic element that support the right wheel so that the right wheel is displaced linearly and that are disposed so as to be aligned in the front-and-rear direction of the body frame, and a left front telescopic element and a left rear telescopic element that support the left wheel so that the left wheel is displaced linearly and that are disposed so as to be aligned in the front-and-rear direction of the body frame.

17. The vehicle according to claim 11, wherein the right wheel is a right front wheel and the left wheel is a left front wheel.

18. The vehicle according to claim 11, wherein the suspension device includes:
a right shock absorbing device which supports the right wheel at a lower portion thereof and absorbs an upward displacement of the right wheel in an up-and-down direction of the body frame;
a left shock absorbing device which supports the left wheel at a lower portion thereof and absorbs an upward displacement of the left wheel in the up-and-down direction of the body frame; and
a link mechanism; wherein
the link mechanism includes:
a right side portion that supports an upper portion of the right shock absorbing device so as to rotate about a right steering axis that extends in the up-and-down direction of the body frame;
a left side portion that supports an upper portion of the left shock absorbing device so as to rotate about a left steering axis that is parallel or substantially parallel to the right steering axis;
an upper cross portion that supports, at a right end portion thereof, an upper portion of the right side portion so as to rotate about an upper right axis that extends in the front-and-rear direction of the body frame and supports, at a left end portion thereof, an upper portion of the left side portion so as to turn about an upper left axis that is parallel or substantially parallel to the upper right axis and that is supported at a middle portion thereof on the body frame so as to turn about an upper middle axis that is parallel or substantially parallel to the upper right axis and the upper left axis; and a lower cross portion that supports, at a right end portion thereof, a lower portion of the right side portion so as to turn about a lower right axis that is parallel or substantially parallel to the upper right axis and supports, at a left end portion thereof, a lower portion of the left side portion so as to turn about a lower left axis that is parallel or substantially parallel to the upper left axis and that is supported at a middle portion thereof on the body frame so as to turn about a lower middle axis that is parallel or substantially parallel to the upper middle axis.

19. The vehicle according to claim 11, wherein
the right cover member is located at least partially between a lowermost portion of the right brake disc and the ground contact point of the left tire when the body frame is in an upright state; and
the left cover member is located at least partially between a lowermost portion of the left brake disc and a ground contact point of the right tire when the body frame is in the upright state.

20. The vehicle according to claim 11, wherein
the right cover member is located at least partially between a lowermost portion of the right brake disc and the ground contact point of the left tire when the body frame leans to the left of the vehicle; and
the left cover member is located at least partially between a lowermost portion of the left brake disc and a ground contact point of the right tire when the body frame leans to the right of the vehicle.

* * * * *